US012812529B2

(12) United States Patent
Li et al.

(10) Patent No.: US 12,812,529 B2
(45) Date of Patent: Nov. 24, 2026

(54) MEASUREMENT RELAXATION METHOD, DEVICE APPARATUS, STORAGE MEDIUM AND APPARATUS

(71) Applicant: BEIJING XIAOMI MOBILE SOFTWARE CO., LTD., Beijing (CN)

(72) Inventors: Yanhua Li, Beijing (CN); Ziquan Hu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 241 days.

(21) Appl. No.: 18/727,659

(22) PCT Filed: Jan. 11, 2022

(86) PCT No.: PCT/CN2022/071362
§ 371 (c)(1),
(2) Date: Jul. 9, 2024

(87) PCT Pub. No.: WO2023/133686
PCT Pub. Date: Jul. 20, 2023

(65) Prior Publication Data
US 2025/0097839 A1 Mar. 20, 2025

(51) Int. Cl.
*H04W 52/02* (2009.01)
*H04W 24/02* (2009.01)

(52) U.S. Cl.
CPC ....... *H04W 52/0212* (2013.01); *H04W 24/02* (2013.01)

(58) Field of Classification Search
CPC . H04W 24/10; H04W 24/08; H04W 36/0088; H04W 48/16; H04W 24/02; H04W 36/0058; H04W 36/0085; H04W 36/302; H04W 36/0094; H04W 36/00; H04W 36/0061; H04W 76/20; H04W 52/0245
See application file for complete search history.

(56) References Cited

U.S. PATENT DOCUMENTS

2016/0381610 A1* 12/2016 Pu .................... H04W 36/0058 455/436
2022/0007225 A1* 1/2022 Li ........................ H04W 48/16
(Continued)

FOREIGN PATENT DOCUMENTS

CN 113038524 A 6/2021
CN 113365301 A 9/2021
(Continued)

OTHER PUBLICATIONS

Vivo "RAN2 impacts on RLM/BFD relaxation for power saving" 3GPP TSG-RAN WG2 Meeting #116-e, R2-2109739, Nov. 2021, 8 pages.
Xiaomi "Summary of [AT116-e][036][ePowSav] RLM/BFD relaxation (Xiaomi)" 3GPP TSG-RAN WG2 Meeting #116-e. R2-2111528, Nov. 2021, 17 pages.
(Continued)

*Primary Examiner* — Khalid W Shaheed
(74) *Attorney, Agent, or Firm* — Cozen O'Connor

(57) ABSTRACT

A measurement relaxation method is provided. The method includes: configuring a measurement relaxation criterion to a UE. The measurement relaxation criterion may be at least one of a Radio Link Monitoring (RLM) measurement relaxation criterion, a Beam Failure Detection (BFD) measurement relaxation criterion, or a Radio Resource management (RRM) measurement relaxation criterion.

20 Claims, 14 Drawing Sheets

(56) References Cited

U.S. PATENT DOCUMENTS

| | | | | |
|---|---|---|---|---|
| 2022/0248244 | A1* | 8/2022 | Chen | H04W 52/0235 |
| 2023/0109703 | A1* | 4/2023 | Sun | H04W 24/08 370/329 |
| 2023/0125530 | A1* | 4/2023 | Sharma | H04W 36/0088 370/329 |

FOREIGN PATENT DOCUMENTS

| | | | |
|---|---|---|---|
| CN | 113473556 | A | 10/2021 |
| CN | 113543193 | A | 10/2021 |
| CN | 113840320 | A | 12/2021 |
| WO | WO 2020204463 | A1 | 10/2020 |
| WO | WO 2021175126 | A1 | 9/2021 |
| WO | WO 2021259155 | A1 | 12/2021 |

OTHER PUBLICATIONS

Chinese Patent Application No. 202280000074.8, Office Action dated Sep. 1, 2023, 9 pages.
Chinese Patent Application No. 202280000074.8, English translation of Office Action dated Sep. 1, 2023, 5 pages.
PCT/CN2022/071362 International Search Report and Written Opinion dated Oct. 10, 2022, 10 pages.
PCT/CN2022/071362 English translation of International Search Report and Written Opinion dated Oct. 10, 2022, 10 pages.
Huawei et al. "RRM measurement relaxation for RedCap UE" 3GPP TSG-RAN WG2 Meeting #116-e, R2-2109579, Nov. 2021, 3 pages.
European Patent Application No. 22919352.9, Search and Opinion dated Feb. 19, 2025, 9 pages.

* cited by examiner

MEASUREMENT RELAXATION METHOD, DEVICE APPARATUS, STORAGE MEDIUM AND APPARATUS

CROSS-REFERENCE TO RELATED APPLICATION

This application is a U.S. national phase of International Application No. PCT/CN2022/071362, filed with the State Intellectual Property Office of P. R. China on Jan. 11, 2022, the entire contents of which are incorporated herein by reference.

FIELD

The present disclosure relates to the field of wireless communication technologies, particularly to a measurement relaxation method, an equipment, a storage medium, and a device.

BACKGROUND

In a wireless communication system, a User Equipment (UE) can perform various measurement tasks associated with connection a UE to the wireless communication system, such as a Radio Link Monitoring (RLM) measurement, a Beam Failure Detection (BFD) measurement, a Radio Resource Management (RRM) measurement, etc. Furthermore, a measurement relaxation mechanism is introduced for the above measurement behaviors to save UE power consumption. However, how configuring a base station with a measurement relaxation criterion to the UE and how to instruct the UE to perform the measurement relaxation are urgent problems that need to be solved.

SUMMARY

The present disclosure provides a measurement relaxation method, an equipment, a storage medium, and a device.

Embodiments of a first aspect of the present disclosure provide a measurement relaxation method, the method is applied to a master node (MN) base station, and includes:

configuring a measurement relaxation criterion to a user equipment (UE).

Embodiments of a second aspect of the present disclosure provide a measurement relaxation method, the method is applied to a secondary node (SN) base station, and includes:

configuring a measurement relaxation criterion to a UE.

Embodiments of a third aspect of the present disclosure provide a measurement relaxation method, the method is applied to a base station group, and includes:

configuring a measurement relaxation criterion to a UE.

Embodiments of a fourth aspect of the present disclosure provide a measurement relaxation method, the method is applied to a UE, and includes:

receiving a measurement relaxation criterion configured by a base station.

Additional aspects and advantages of the present disclosure will be given in part in the following description, in part as will become apparent from the following description, or as will be learned through the practice of the present disclosure.

BRIEF DESCRIPTION OF THE DRAWINGS

The foregoing and/or additional aspects and advantages of the present disclosure will become apparent and easy to understand from the following description of embodiments in conjunction with the accompanying drawings, wherein.

DETAILED DESCRIPTION

Embodiments of the present disclosure are described in detail below, and examples of the embodiments are shown in accompanying drawings. In the description with reference to the drawings, unless otherwise indicated, the same numbers in different drawings indicate the same or similar elements. Embodiments described below do not represent all embodiments consistent with the present disclosure. Instead, they are only examples of devices and methods consistent with some aspects of the present disclosure as detailed in the attached claims.

Terms used in the embodiments of the present disclosure are used solely for the purpose of describing particular embodiments and are not intended to limit the embodiments of the present disclosure. Singular forms "a" and "the" as used in the embodiments of the present disclosure and in the attached claims are also intended to encompass a majority form, unless the context clearly indicates otherwise. It should also be understood that the term "and/or" as used herein refers to and encompasses any or all possible combinations of one or more of associated listed items.

It should be understood that while terms first, second, third, etc. may be used in the embodiments of the present disclosure to describe various types of information, such information should not be limited to these terms. These terms are only used to distinguish the same type of information from one another. For example, without departing from the scope of embodiments of the present disclosure, a first information may also be referred to as a second information, and similarly, a second information may be referred to as a first information. Depending on the context, words "if" and "as", as used herein, may be interpreted as "when . . . " or "at . . . " or "in response to a determination".

Embodiments of the present disclosure are described in detail below, and examples of the embodiments are shown in the accompanying drawings, wherein the same or similar symbols throughout indicate the same or similar elements. The embodiments described below with reference to the accompanying drawings are exemplary and are intended to be used to explain the present disclosure and are not to be construed as limitations of the present disclosure.

A measurement relaxation method, an equipment, a storage medium, and a device provided in the present disclosure are described in detail below with reference to the accompanying drawings.

Figure 1:
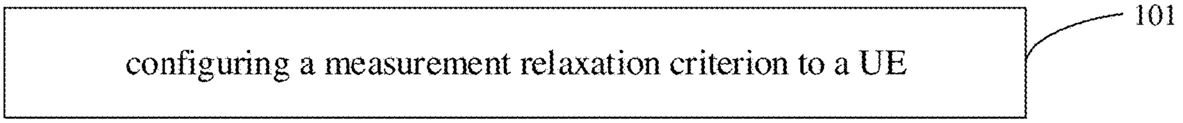
FIG. 1 is a flowchart of a measurement relaxation method provided in an embodiment of the present disclosure.

FIG. 1 is a flowchart of a measurement relaxation method provided in an embodiment of the present disclosure, and the method is applied to a master node (MN) base station. As shown in FIG. 1, the measurement relaxation method can include the following steps.

Step 101, a measurement relaxation criterion is configured to a user equipment (UE).

It is to be noted that in an embodiment of the present disclosure, the UE can be an equipment that provides voice and/or data connectivity to a user. A terminal equipment can communicate with one or more core networks via a Radio Access Network (RAN), and the UE can be an IoT terminal, such as a sensor equipment, a cell phone (or "cellular" phone), and a computer with the IoT terminal, which can be, for example, a stationary, portable, pocket-sized, handheld, computer-built, or vehicle-mounted device. For example, the terminal equipment may be a station (STA), a subscriber unit, a subscriber station, a mobile station, a mobile, a remote station, an access point, a remote terminal, an access terminal, a user terminal, or a user agent. Alternatively, the UE can be an unmanned aerial vehicle equipment. Alternatively, the UE can be a vehicle-mounted equipment, such as an electronic control unit (ECU) with a wireless communication function, or a wireless terminal with an external ECU. Alternatively, the UE can be a roadside equipment, such as a street light, a signal light, or other roadside equipment, etc., with the wireless communication function.

In an embodiment of the present disclosure, the measurement relaxation criterion can include at least one of the following:

- a Radio Link Monitoring (RLM) measurement relaxation criterion;
- a Beam Failure Detection (BFD) measurement relaxation criterion; or
- a Radio Resource management (RRM) measurement relaxation criterion.

Further, in an embodiment of the present disclosure, the above measurement relaxation criterion can be a cell-specific measurement relaxation criterion. In an embodiment of the present disclosure, the cell can include a secondary cell and/or a master cell.

As an embodiment, the RLM measurement relaxation criterion is configured for the master cell.

As an embodiment, the BFD measurement relaxation criterion is configured for the master cell or the secondary cell.

As an embodiment, the RRM measurement relaxation criterion is configured for the master cell.

Further, in an embodiment of the present disclosure, the MN can autonomously configure the measurement relaxation criterion to the UE. In another embodiment of the present disclosure, the MN can also configure the measurement relaxation criterion to the UE via the SN. A detailed description of this part will be provided in subsequent embodiments.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. In other words, the measurement relaxation criterion can be configured for the terminal by either or both of a master cell group (MCG) and a secondary cell group (SCG), and thus the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 2:
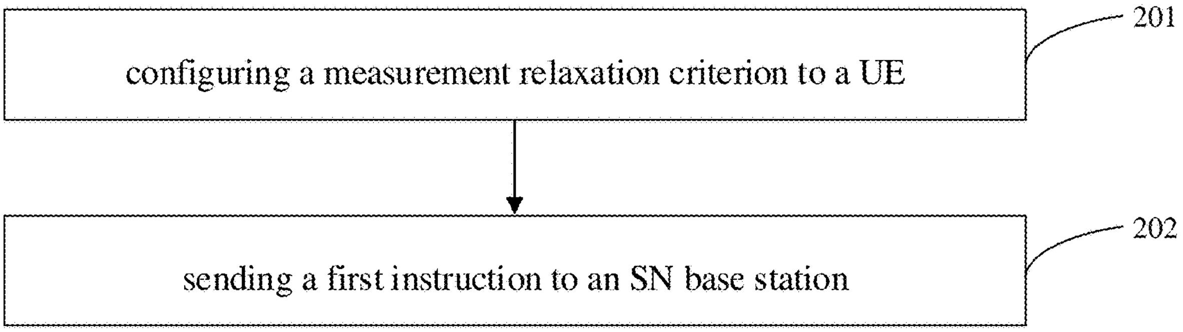
FIG. 2 is a flowchart of a measurement relaxation method provided in another embodiment of the present disclosure.

FIG. 2 is a flowchart of another measurement relaxation method provided in an embodiment of the present disclosure, and the method is applied to the MN base station. As shown in FIG. 2, the measurement relaxation method can include the following steps.

Step 201, a measurement relaxation criterion is configured to the UE.

In an embodiment of the present disclosure, a detailed description of the measurement relaxation criterion can be referred to the relevant description in the above embodiment, and the embodiments of the present disclosure will not be repeated herein.

Step 202, a first instruction is sent to a secondary node (SN) base station.

In an embodiment of the present disclosure, the first instruction is configured to indicate: whether the SN base station configures the measurement relaxation criterion to the UE.

In an embodiment of the present disclosure, the method of sending the first instruction from the MN base station to the SN base station can include the following steps.

Step a, auxiliary information sent by the SN base station is obtained.

In an embodiment of the present disclosure, the auxiliary information can include an operating frequency band corresponding to the SN base station.

Step b, the first instruction is sent to the SN base station based on the auxiliary information.

Specifically, in an embodiment of the present disclosure, the method of sending the first instruction from the MN base station to the SN base station based on the auxiliary information can include: if it is determined, based on the auxiliary information, that the SN base station is operating at a high frequency, sending, to the SN base station, the first instruction for instructing the SN base station to not configure the measurement relaxation criterion to the UE, otherwise, sending, to the SN base station, the first instruction for instructing the SN base station to configure the measurement relaxation criterion to the UE.

Further, in an embodiment of the present disclosure, the SN base station, after obtaining the first instruction sent by the MN base station, can configure the measurement relaxation criterion to the UE based on the first instruction.

Then, as can be seen from the above contents, in this embodiment, the MN base station and the SN base station can configure the measurement relaxation criterion to the UE respectively. Further, it is to be noted that, in an embodiment of the present disclosure, when the measurement relaxation criterion is the RLM measurement relaxation criterion, in response to a fast MCG link recovery being configured to the MN base station, the RLM measurement relaxation criterion can be configured to the UE using the MN base station and the SN base station, respectively.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 3:
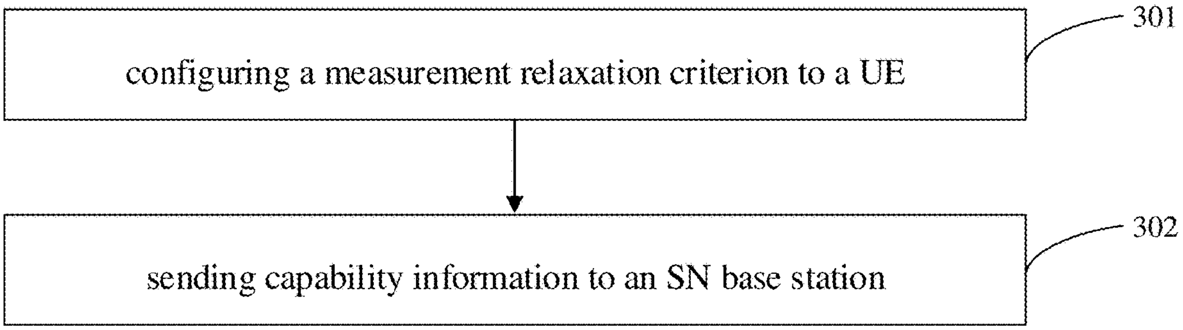
FIG. 3 is a flowchart of a measurement relaxation method provided in a further embodiment of the present disclosure.

FIG. 3 a flowchart of a further measurement relaxation method provided in an embodiment of the present disclosure, and the method is applied to an MN base station. As shown in FIG. 3, the measurement relaxation method can include the following steps.

Step 301, a measurement relaxation criterion is configured to a UE.

In an embodiment of the present disclosure, a detailed description of the measurement relaxation criterion can be referred to the relevant description in the above embodiment, and the embodiments of the present disclosure will not be repeated herein.

Step 302, capability information is sent to an SN base station.

In an embodiment of the present disclosure, the capability information can include information on whether the UE supports a measurement relaxation.

In an embodiment of the present disclosure, when the measurement relaxation criterion to be configured is different, the corresponding capability information is different. Specifically, in an embodiment of the present disclosure, if the measurement relaxation criterion to be configured is an RRM measurement relaxation criterion, the corresponding capability information sent by the MN base station to the SN base station is information on whether the UE supports the RRM measurement relaxation. In another embodiment of the present disclosure, if the measurement relaxation criterion to be configured is an RLM measurement relaxation criterion, the corresponding capability information sent by the MN base station to the SN base station is information on whether the UE supports the RLM measurement relaxation. In a further embodiment of the present disclosure, if the measurement relaxation criterion to be configured is a BFD measurement relaxation criterion, the corresponding capability information sent by the MN base station to the SN base station is information on whether the UE supports the BFD measurement relaxation criterion.

Further, in an embodiment of the present disclosure, after obtaining the capability information sent by the MN base station, the SN base station can configure the measurement relaxation criterion to the UE based on the capability information. Specifically, in an embodiment of the present disclosure, if the capability information indicates that the UE supports the measurement relaxation, the SN base station can configure the corresponding measurement relaxation criterion to the UE. For example, in an embodiment of the present disclosure, if the MN base station configures the RLM measurement relaxation criterion to the UE, and the capability information received by the SN base station from the MN base station indicates that the UE supports the RLM measurement relaxation, then the SN base station configures the RLM measurement relaxation criterion to the UE.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 4:
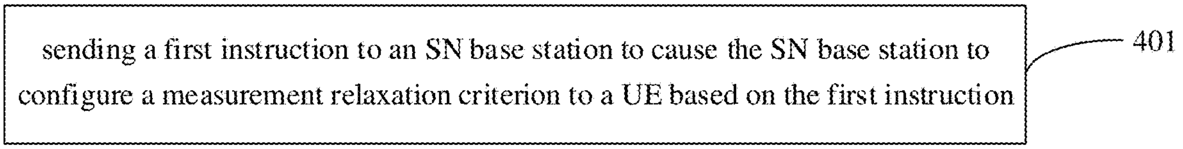
FIG. 4 is a flowchart of a measurement relaxation method provided in a further embodiment of the present disclosure.

FIG. 4 a flowchart of a further measurement relaxation method provided in an embodiment of the present disclosure, and the method is applied to an MN base station. As shown in FIG. 4, the measurement relaxation method can include the following steps.

Step 401, a first instruction is sent to an SN base station to cause the SN base station to configure a measurement relaxation criterion to a UE based on the first instruction.

A detailed description of the first instruction can be referred to the relevant description in the above embodiments, and the embodiments of the present disclosure will not be repeated herein.

In the embodiments of the present disclosure, the SN base station can configure the measurement relaxation criterion to the UE based on the first instruction after obtaining the first instruction sent by the MN base station.

Thus, in the embodiment, the MN base station can instruct the SN base station to configure the measurement relaxation criterion to the UE.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 5:
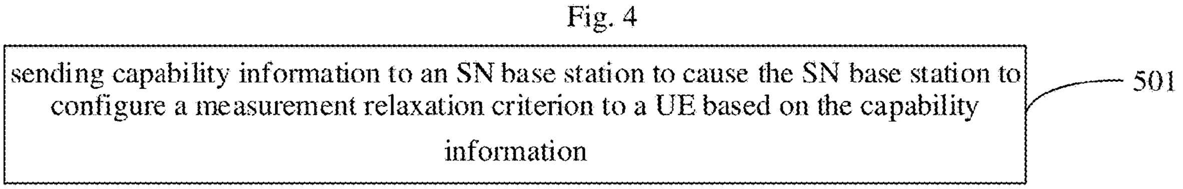
FIG. 5 is a flowchart of a measurement relaxation method provided in a further embodiment of the present disclosure.

FIG. 5 a flowchart of a further measurement relaxation method provided in an embodiment of the present disclosure, and the method is applied to an MN base station. As shown in FIG. 5, the measurement relaxation method can include the following steps.

Step 501, capability information is sent to an SN base station to cause the SN base station to a the measurement relaxation criterion to a UE based on the capability information.

A relevant introduction about the capability information can be referred to the detailed introduction in the above embodiments, and the embodiments of the present disclosure will not be repeated herein.

In the embodiment of the present disclosure, the SN base station can configure the measurement relaxation criterion to the UE based on the capability information after obtaining the capability information sent by the MN base station.

Thus, in the present embodiment, the MN base station can instruct the SN base station to configure the measurement relaxation criterion to the UE.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 6:
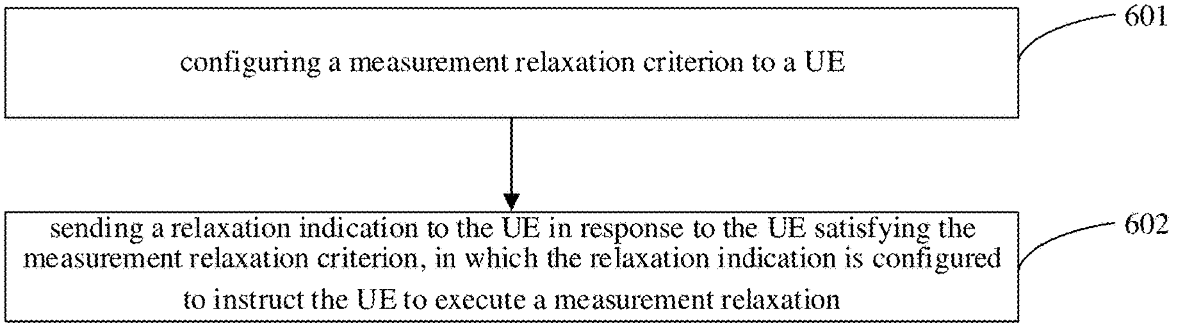
FIG. 6 is a flowchart of a measurement relaxation method provided in a further embodiment of the present disclosure.

FIG. 6 a flowchart of a further measurement relaxation method provided in an embodiment of the present disclosure, and the method is applied to an MN base station. As shown in FIG. 6, the measurement relaxation method can include the following steps.

Step 601, a measurement relaxation criterion is configured to a UE.

In an embodiment of the present disclosure, the detailed description of the measurement relaxation criterion can be referred to the relevant description in the above embodiment, and the embodiments of the present disclosure will not be repeated herein.

Step 602, a relaxation indication is sent to the UE in response to the UE satisfying the measurement relaxation criterion, in which the relaxation indication is configured to instruct the UE to execute a measurement relaxation.

In an embodiment of the present disclosure, in response to the UE satisfying the measurement relaxation criterion configured in step 101 above, the relaxation indication is sent to the UE to instruct the UE to execute the measurement relaxation. For example, in an embodiment of the present disclosure, if the MN base station configures an RRM measurement relaxation criterion to the UE in step 601, the MN base station can send the relaxation indication to the UE in response to the UE satisfying the RRM measurement relaxation criterion, to instruct the UE to execute the RRM measurement relaxation.

In an embodiment of the present disclosure, the relaxation indication is a relaxation indication primarily for the cell. In one embodiment of the present disclosure, the cell can include at least one of a secondary cell, or a master cell.

Further, in an embodiment of the present disclosure, the MN base station can autonomously send the relaxation indication to the UE. In another embodiment of the present disclosure, the MN base station can also send the relaxation indication to the UE based on relaxation result information sent by the SN base station. This part will be described in detail in subsequent embodiments.

Furthermore, the above steps 601-602 can be implemented individually or in combination, which is not limited in the present disclosure.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 7:
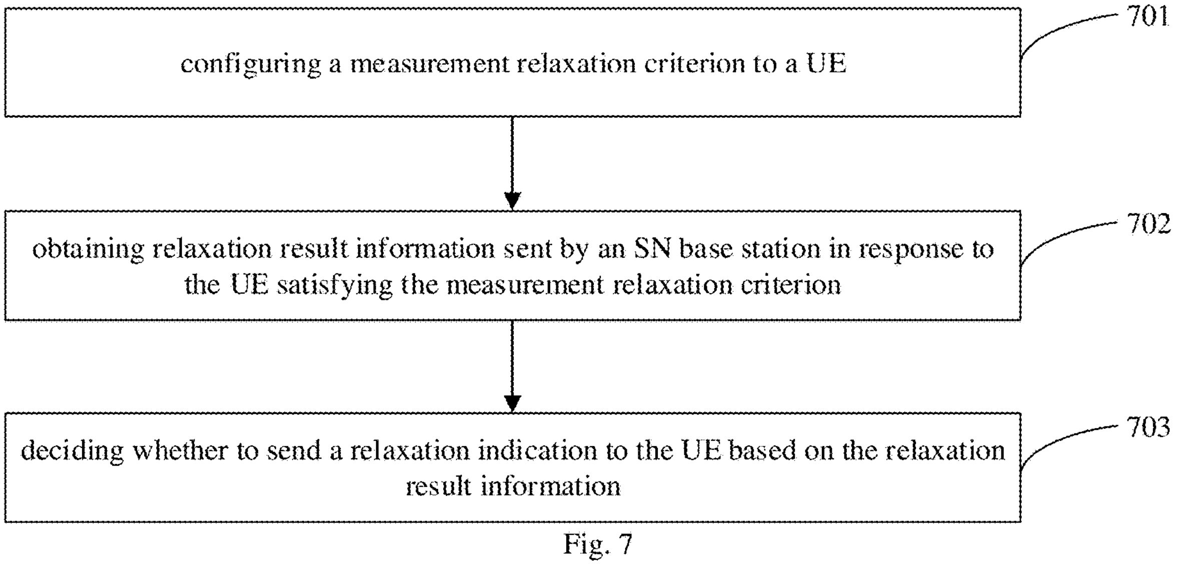
FIG. 7 is a flowchart of a measurement relaxation method provided in a further embodiment of the present disclosure.

FIG. 7 a flowchart of a further measurement relaxation method provided in an embodiment of the present disclosure, and the method is applied to an MN base station. As shown in FIG. 7, the measurement relaxation method can include the following steps.

Step 701, a measurement relaxation criterion is configured to a UE.

In an embodiment of the present disclosure, the detailed description of the measurement relaxation criterion can be referred to the relevant description in the above embodiment, and the embodiments of the present disclosure will not be repeated herein.

Step 702, relaxation result information sent by an SN base station is obtained in response to the UE satisfying the measurement relaxation criterion.

In an embodiment of the present disclosure, the relaxation result information can include: result information that the SN base station instructs the UE to execute a measurement relaxation, or, result information that the SN base station instructs the UE not to execute the measurement relaxation.

Step 703, it is decided whether to send a relaxation indication to the UE based on the relaxation result information.

In an embodiment of the present disclosure, the method of the MN sending the relaxation indication to the UE based on the relaxation result information can be achieved as follows. If the relaxation result information includes result information that the SN base station instructs the UE to execute the measurement relaxation, the MN base station sends a measurement relaxation indication to the UE in order to instruct the UE to execute the measurement relaxation; and if the relaxation result information includes result information that the SN base station instructs the UE to not execute the measurement relaxation, the MN base station does not send the measurement relaxation indication to the UE, i.e. the UE is not allowed to execute the measurement relaxation.

Furthermore, the above steps 701-703 can be implemented individually or in combination, which is not limited in the present disclosure.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 8A:
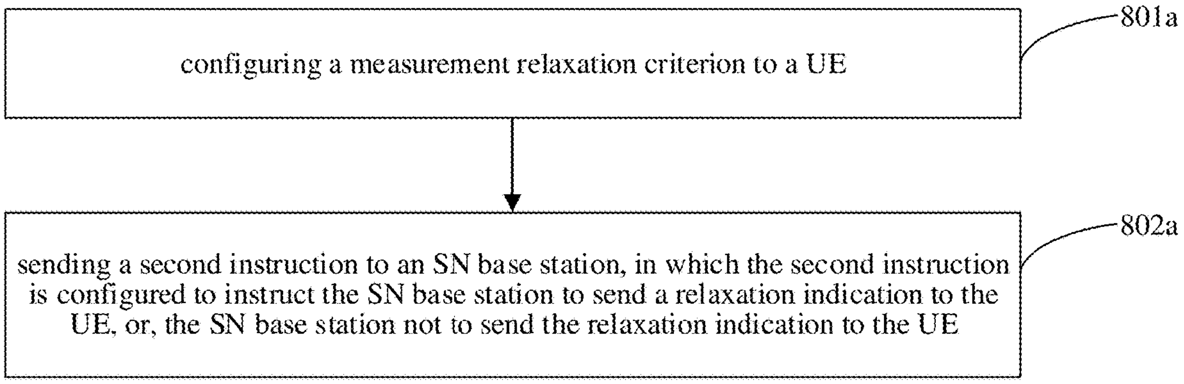
FIG. 8*a* is a flowchart of a measurement relaxation method provided in a further embodiment of the present disclosure.

FIG. 8*a* a flowchart of a further measurement relaxation method provided in an embodiment of the present disclosure, and the method is applied to an MN base station. As shown in FIG. 8*a*, the measurement relaxation method can include the following steps.

Step 801*a*, a measurement relaxation criterion is configured to a UE.

Step 802*a*, a second instruction is sent to an SN base station, in which the second instruction is configured to instruct the SN base station to send a relaxation indication to the UE, or, the SN base station not to send the relaxation indication to the UE.

In an embodiment of the present disclosure, the SN base station, after obtaining the second instruction sent by the MN base station, can send the relaxation indication to the UE based on the second instruction.

Furthermore, the above steps 801*a*-802*a* can be implemented individually or in combination, which is not limited in the present disclosure.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 8B:
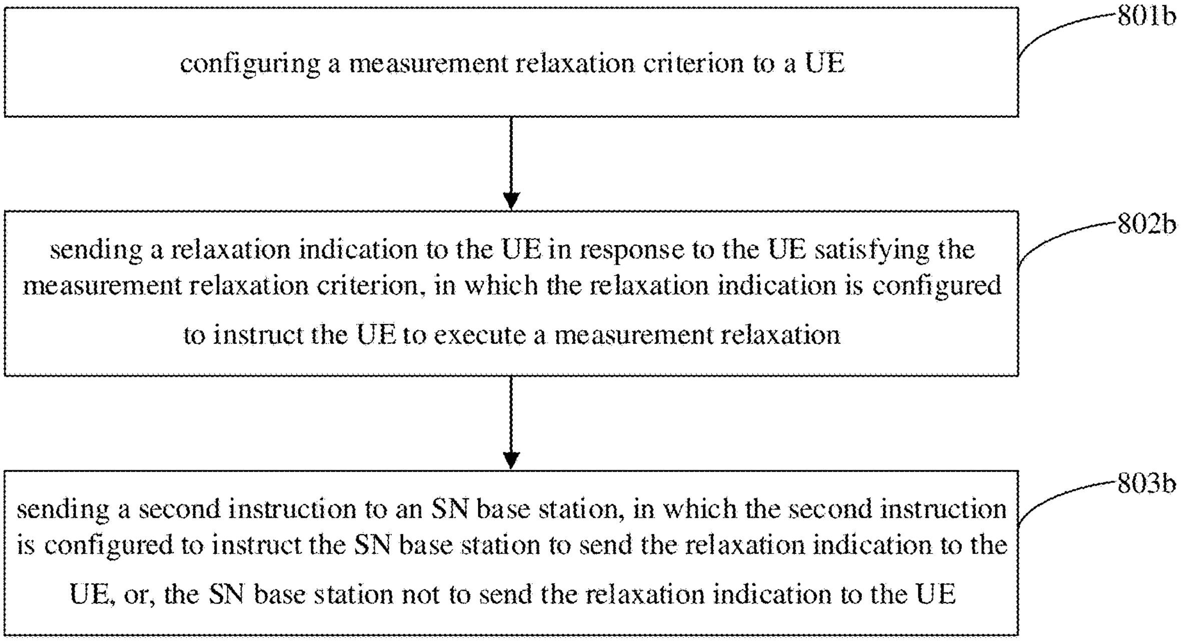
FIG. 8*b* is a flowchart of a measurement relaxation method provided in a further embodiment of the present disclosure.

FIG. 8*b* a flowchart of a further measurement relaxation method provided in an embodiment of the present disclosure, and the method is applied to an MN base station. As shown in FIG. 8*b*, the measurement relaxation method can include the following steps.

Step 801*b*, a measurement relaxation criterion is configured to a UE.

Step 802*b*, a relaxation indication is sent to the UE in response to the UE satisfying the measurement relaxation criterion, in which the relaxation indication is configured to instruct the UE to execute a measurement relaxation.

Step 803*b*, a second instruction is sent to an SN base station, in which the second instruction is configured to instruct the SN base station to send the relaxation indication to the UE, or, the SN base station not to send the relaxation indication to the UE.

Regarding the introduction about the above steps 801*b*-802*b*, reference can be made to the above embodiments, which is not elaborated herein.

In addition, the above steps 801*b*-803*b* may be implemented individually or in combination, and the present disclosure is not limited thereto.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 9A:
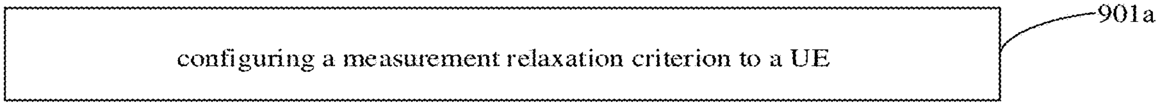
FIG. 9*a* is a flowchart of a measurement relaxation method provided in a further embodiment of the present disclosure.

FIG. 9*a* is a flowchart of a further measurement relaxation method provided in an embodiment of the present disclosure, and the method is applied to an SN base station. As shown in FIG. 9*a*, the measurement relaxation method can include the following steps.

Step 901*a*, a measurement relaxation criterion is configured to a UE.

In an embodiment of the present disclosure, the measurement relaxation criterion can include at least one of the following:

an RLM measurement relaxation criterion;

a BFD measurement relaxation criterion; or an RRM measurement relaxation criterion.

In an embodiment of the present disclosure, the above measurement relaxation criterion is a cell-specific measurement relaxation criterion. In an embodiment of the present disclosure, the cell can include a secondary cell and/or a master cell.

Further, in an embodiment of the present disclosure, the SN base station can autonomously configure the measurement relaxation criterion to the UE. In another embodiment of the present disclosure, the SN base station can also configure the measurement relaxation criterion to the UE by obtaining a first instruction and/or capability information sent by the MN base station. A detailed description of this part will be provided in subsequent embodiments.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 9B:
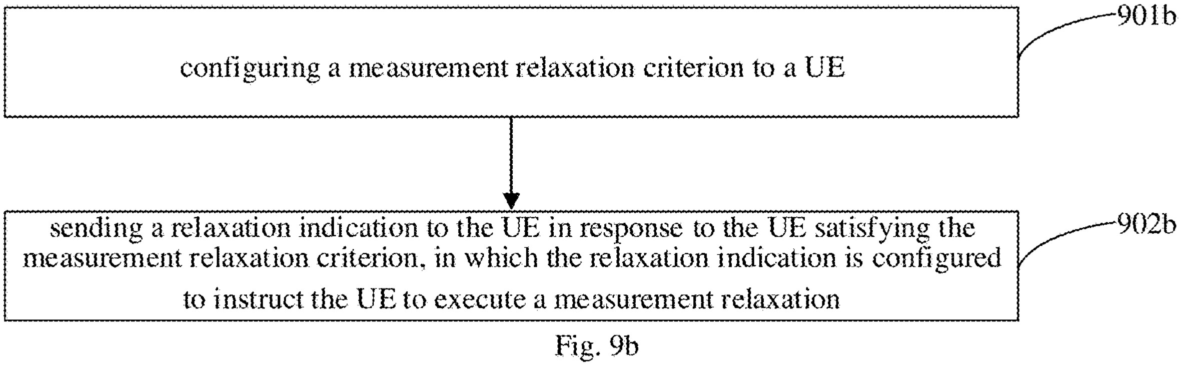
FIG. 9*b* is a flowchart of a measurement relaxation method provided in a further embodiment of the present disclosure.

FIG. 9*b* is a flowchart of a further measurement relaxation method provided in an embodiment of the present disclosure, and the method is applied to an SN base station. As shown in FIG. 9*b*, the measurement relaxation method can include the following steps.

Step 901*b*, a measurement relaxation criterion is configured to a UE.

A detailed description of step 901*b* can be referred to the relevant description in the above embodiment, and the embodiments of the present disclosure will not be repeated herein.

Step 902*b*, a relaxation indication is sent to the UE in response to the UE satisfying the measurement relaxation criterion, in which the relaxation indication is configured to instruct the UE to execute a measurement relaxation.

In an embodiment of the present disclosure, in response to the UE satisfying the measurement relaxation criterion configured in step 901 above, the relaxation indication is sent to the UE to instruct the UE to execute the measurement relaxation. For example, in an embodiment of the present disclosure, if an RRM measurement relaxation criterion is configured in step 901, the MN base station can send the relaxation indication to the UE in response to the UE satisfying the RRM measurement relaxation criterion, to instruct the UE to execute the RRM measurement relaxation.

In an embodiment of the present disclosure, the relaxation indication is a relaxation indication primarily for the cell.

Further, in an embodiment of the present disclosure, the SN base station can autonomously send the relaxation indication to the UE. In another embodiment of the present disclosure, the SN base station can also send the relaxation indication to the UE by obtaining a second instruction sent by the MN base station. This part will be described in detail in subsequent embodiments.

It should be understood that the above step 901*b* and step 902*b* can be implemented individually or in combination, which is not limited in the present disclosure.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 10:
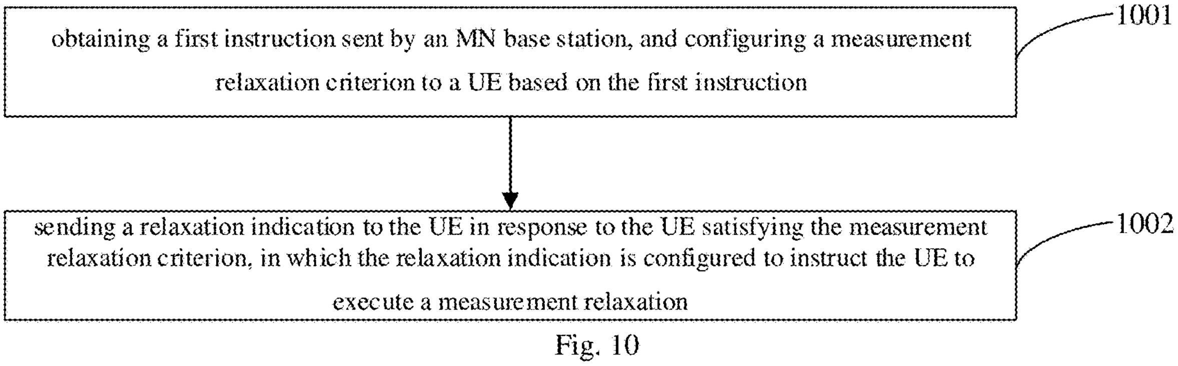
FIG. 10 is a flowchart of a measurement relaxation method provided in a further embodiment of the present disclosure.

FIG. 10 is a flowchart of a further measurement relaxation method provided in an embodiment of the present disclosure, and the method is applied to an SN base station. As shown in FIG. 10, the measurement relaxation method can include the following steps.

Step 1001, a first instruction sent by an MN base station is obtained, and a measurement relaxation criterion is configured to a UE based on the first instruction.

In an embodiment of the present disclosure, the first instruction is configured to indicate whether the SN base station configures the measurement relaxation criterion to the UE.

In an embodiment of the present disclosure, the method of obtaining by the SN base station the first instruction sent by the MN base station can include the following steps.

Step 1, auxiliary information is sent to the MN base station.

Step 2, the first instruction sent by the MN base station is obtained.

Step 1002, a relaxation indication is sent to the UE in response to the UE satisfying the measurement relaxation criterion, in which the relaxation indication is configured to instruct the UE to execute a measurement relaxation.

Regarding the introduction of the above steps 1001-1002, reference can be made to the above embodiments, which is not elaborated herein. In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 11:
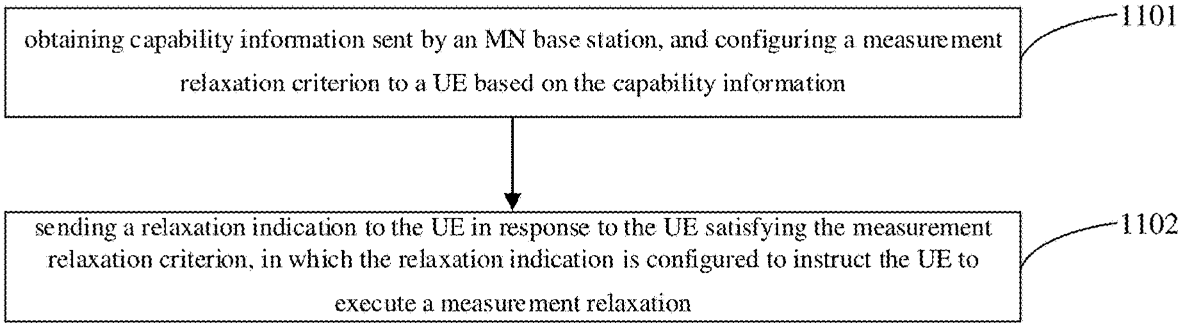
FIG. 11 is a flowchart of a measurement relaxation method provided in a further embodiment of the present disclosure.

FIG. 11 is a flowchart of a further measurement relaxation method provided in an embodiment of the present disclosure, and the method is applied to an SN base station. As shown in FIG. 11, the measurement relaxation method can include the following steps.

Step 1101, capability information sent by an MN base station is obtained, and a measurement relaxation criterion is configured to a UE based on the capability information.

In an embodiment of the present disclosure, the capability information can include information on whether the UE supports a measurement relaxation.

In an embodiment of the present disclosure, when the measurement relaxation criterion to be configured is different, the corresponding capability information is different. Specifically, in an embodiment of the present disclosure, if the measurement relaxation criterion to be configured is an RRM measurement relaxation criterion, the corresponding capability information sent by the MN base station to the SN base station is information on whether the UE supports the RRM measurement relaxation. In another embodiment of the present disclosure, if the measurement relaxation criterion to be configured is an RLM measurement relaxation criterion, the corresponding capability information sent by the MN base station to the SN base station is information on whether the UE supports the RLM measurement relaxation. In a further embodiment of the present disclosure, if the measurement relaxation criterion to be configured is a BFD measurement relaxation criterion, the corresponding capability information sent by the MN base station to the SN base station is information on whether the UE supports the BFD measurement relaxation criterion.

Step 1102, a relaxation indication is sent to the UE in response to the UE satisfying the measurement relaxation criterion, in which the relaxation indication is configured to instruct the UE to execute a measurement relaxation.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 12:
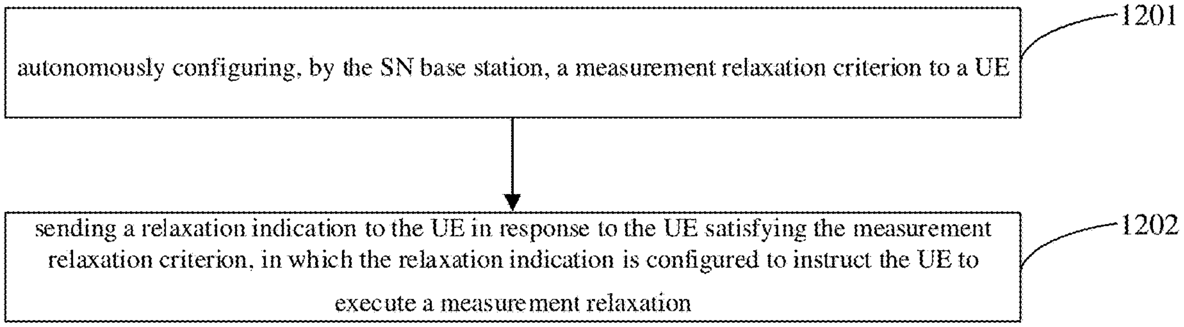
FIG. 12 is a flowchart of a measurement relaxation method provided in a further embodiment of the present disclosure.

FIG. 12 is a flowchart of a further measurement relaxation method provided in an embodiment of the present disclosure, and the method is applied to an SN base station. As shown in FIG. 12, the measurement relaxation method can include the following steps.

Step 1201, the SN base station autonomously configures a measurement relaxation criterion to a UE.

The detailed description of the measurement relaxation criterion can be referred to the relevant description in the above embodiment, and the embodiments of the present disclosure will not be repeated herein.

Step 1202, a relaxation indication is sent to the UE in response to the UE satisfying the measurement relaxation criterion, in which the relaxation indication is configured to instruct the UE to execute a measurement relaxation.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 13:
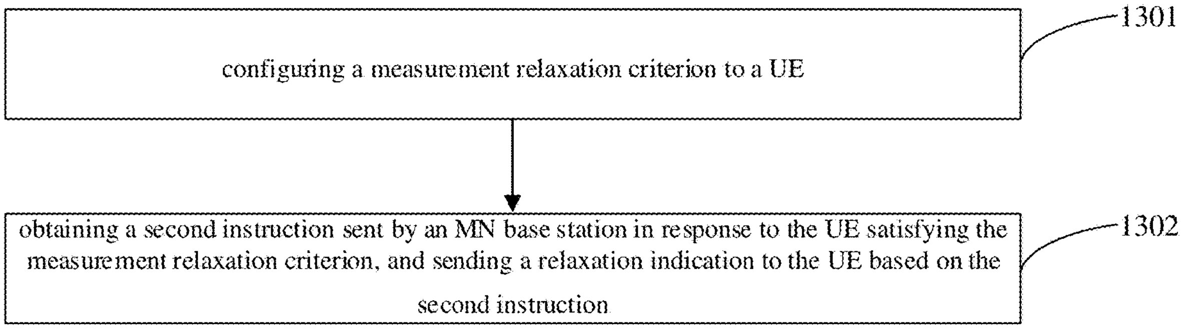
FIG. 13 is a flowchart of a measurement relaxation method provided in a further embodiment of the present disclosure.

FIG. 13 is a flowchart of a further measurement relaxation method provided in an embodiment of the present disclosure, and the method is applied to an SN base station. As shown in FIG. 13, the measurement relaxation method can include the following steps.

Step 1301, a measurement relaxation criterion is configured to a UE.

Step 1302, a second instruction sent by an MN base station is obtained in response to the UE satisfying the measurement relaxation criterion, and a relaxation indication is sent to the UE based on the second instruction.

In an embodiment of the present disclosure, the second instruction is configured to instruct the SN base station to send the relaxation indication to the UE, or, the SN base station not to send the relaxation indication to the UE.

In an embodiment of the present disclosure, the above-described sending the relaxation indication to the UE based on the second instruction can be achieved as follows. If the second instruction instructs the SN base station to send the relaxation indication to the UE, then the SN base station sends the relaxation indication to the UE; and if the second instruction instructs the SN base station not to send the relaxation indication to the UE, then the SN base station does not send the relaxation indication to the UE.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 14:
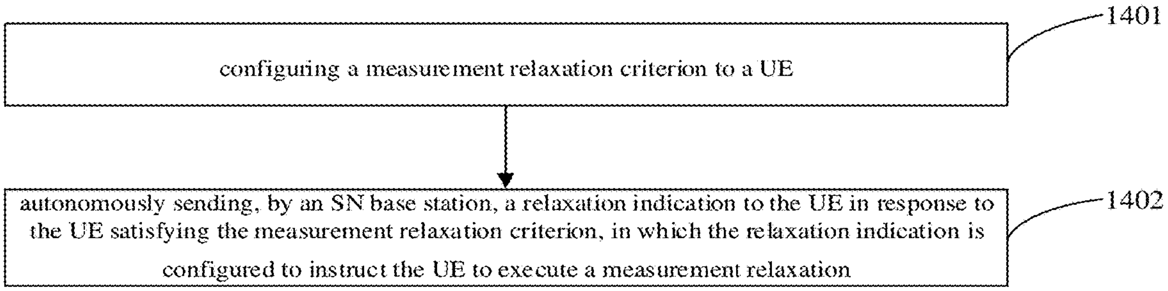
FIG. 14 is a flowchart of a measurement relaxation method provided in a further embodiment of the present disclosure.

FIG. 14 is a flowchart of a further measurement relaxation method provided in an embodiment of the present disclosure, and the method is applied to an SN base station. As shown in FIG. 14, the measurement relaxation method can include the following steps.

Step 1401, a measurement relaxation criterion is configured to a UE.

Step 1402, the SN base station autonomously sends a relaxation indication to the UE in response to the UE satisfying the measurement relaxation criterion, in which the relaxation indication is configured to instruct the UE to execute a measurement relaxation.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 15:
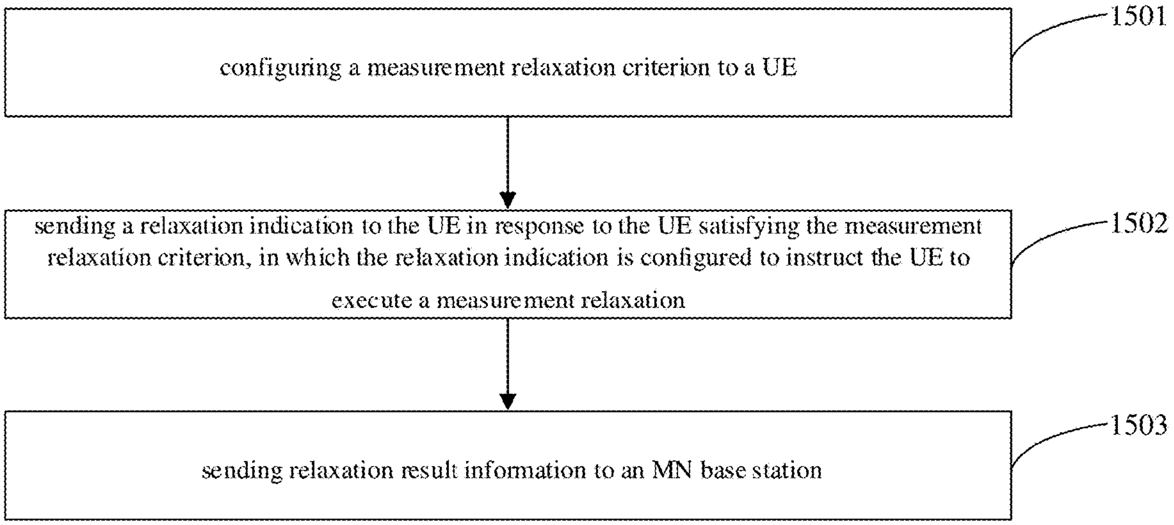
FIG. 15 is a flowchart of a measurement relaxation method provided in a further embodiment of the present disclosure.

FIG. 15 is a flowchart of a further measurement relaxation method provided in an embodiment of the present disclosure, and the method is applied to an SN base station. As shown in FIG. 15, the measurement relaxation method can include the following steps.

Step 1501, a measurement relaxation criterion is configured to a UE.

Step 1502, a relaxation indication is sent to the UE in response to the UE satisfying the measurement relaxation criterion, in which the relaxation indication is configured to instruct the UE to execute a measurement relaxation.

Step 1503, relaxation result information is sent to an MN base station.

In an embodiment of the present disclosure, the relaxation result information can include result information that the SN base station instructs the UE to execute the measurement relaxation, or, result information that the SN base station instructs the UE not to execute the measurement relaxation.

In an embodiment of the present disclosure, after obtaining the relaxation result information sent by the SN base station, the MN base station can send the relaxation indication to the UE based on the relaxation result information.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 16A:
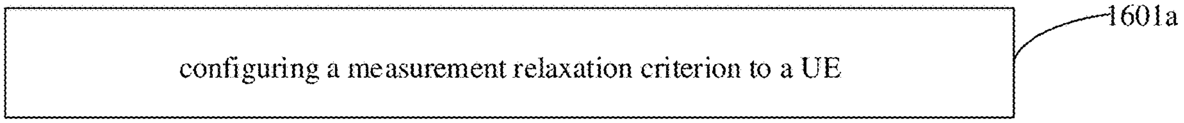
FIG. 16*a* is a flowchart of a measurement relaxation method provided in a further embodiment of the present disclosure.

FIG. **16*a* is a flowchart of a further measurement relaxation method provided in an embodiment of the present disclosure, and the method is applied to a base station group including an MN base station and an SN base station. As shown in FIG. 16*a***, the measurement relaxation method can include the following steps.

Step **1601*a*,** a measurement relaxation criterion is configured to a UE.

In an embodiment of the present disclosure, the measurement relaxation criterion can include at least one of the following:

an RLM measurement relaxation criterion;

a BFD measurement relaxation criterion; or an RRM measurement relaxation criterion.

In an embodiment of the present disclosure, the above measurement relaxation criterion is a cell-specific measurement relaxation criterion. In an embodiment of the present disclosure, the cell can include a secondary cell and/or a master cell.

Further, in an embodiment of the present disclosure, when the measurement relaxation criterion configured to the UE is different, the methods of configuring by the MN base station and the SN base station the measurement relaxation criterion to the UE are different. This part will be described in detail in subsequent embodiments.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 16B:
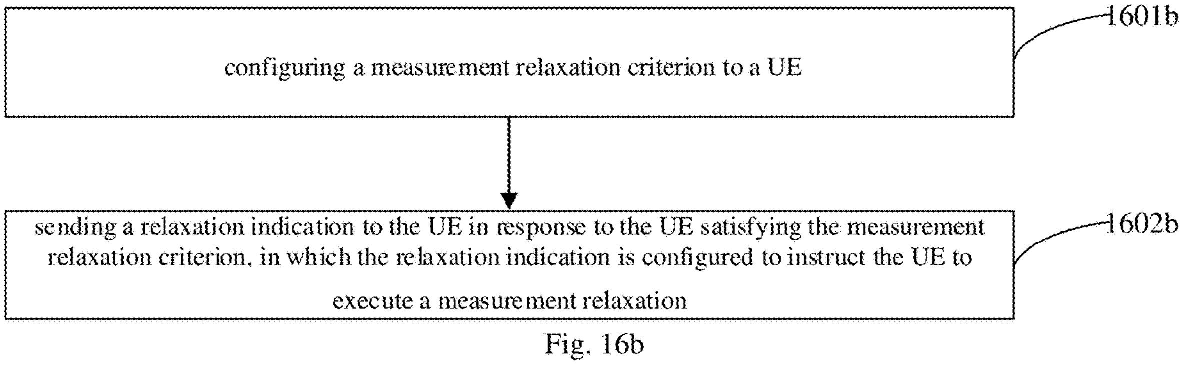
FIG. 16*b* is a flowchart of a measurement relaxation method provided in a further embodiment of the present disclosure.

FIG. **16*b* is a flowchart of a further measurement relaxation method provided in an embodiment of the present disclosure, and the method is applied to a base station group including an MN base station and an SN base station. As shown in FIG. 16*b***, the measurement relaxation method can include the following steps.

Step **1601*b*,** a measurement relaxation criterion is configured to a UE.

The detailed description of step 1601*b* can be referred to the relevant description in the above embodiment, and the embodiments of the present disclosure will not be repeated herein.

Step 1602*b*, a relaxation indication is sent to the UE in response to the UE satisfying the measurement relaxation criterion, in which the relaxation indication is configured to instruct the UE to execute a measurement relaxation.

In an embodiment of the present disclosure, in response to the UE satisfying the measurement relaxation criterion, the relaxation indication can be sent to the UE utilizing the MN base station and/or the SN base station. The detailed description of this part will be provided in subsequent embodiments.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 17:
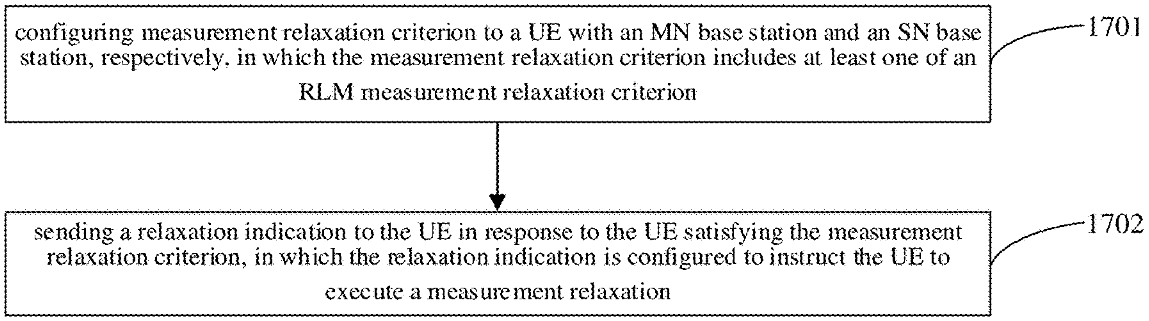
FIG. 17 is a flowchart of a measurement relaxation method provided in a further embodiment of the present disclosure.

FIG. 17 is a flowchart of a further measurement relaxation method provided in an embodiment of the present disclosure, and the method is applied to a base station group including an MN base station and an SN base station. As shown in FIG. 17, the measurement relaxation method can include the following steps.

Step 1701, a measurement relaxation criterion is configured to a UE with the MN base station and the SN base station, respectively, in which the measurement relaxation criterion includes at least one of an RLM measurement relaxation criterion, a BFD measurement relaxation criterion, or an RRM measurement relaxation criterion.

In an embodiment of the present disclosure, in an NE-DC scenario, the measurement relaxation criterion is configured to the UE with the MN base station.

In an embodiment of the present disclosure, in an NR-DC scenario, the measurement relaxation criterion can be configured to the UE with the MN base station and the SN base station, respectively.

It should be understood that the measurement relaxation criterion can also be configured to the UE via the SN base station only.

It is noted that in an embodiment of the present disclosure, when the measurement relaxation criterion is the RLM measurement relaxation criterion, in response to the MN base station being configured with a fast MCG link recovery, the MN base station and the SN base station can be utilized to configure the RLM measurement relaxation criterion to the UE, respectively.

Step 1702, a relaxation indication is sent to a UE in response to the UE satisfying the measurement relaxation criterion, in which the relaxation indication is configured to instruct the UE to execute a measurement relaxation.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 18:
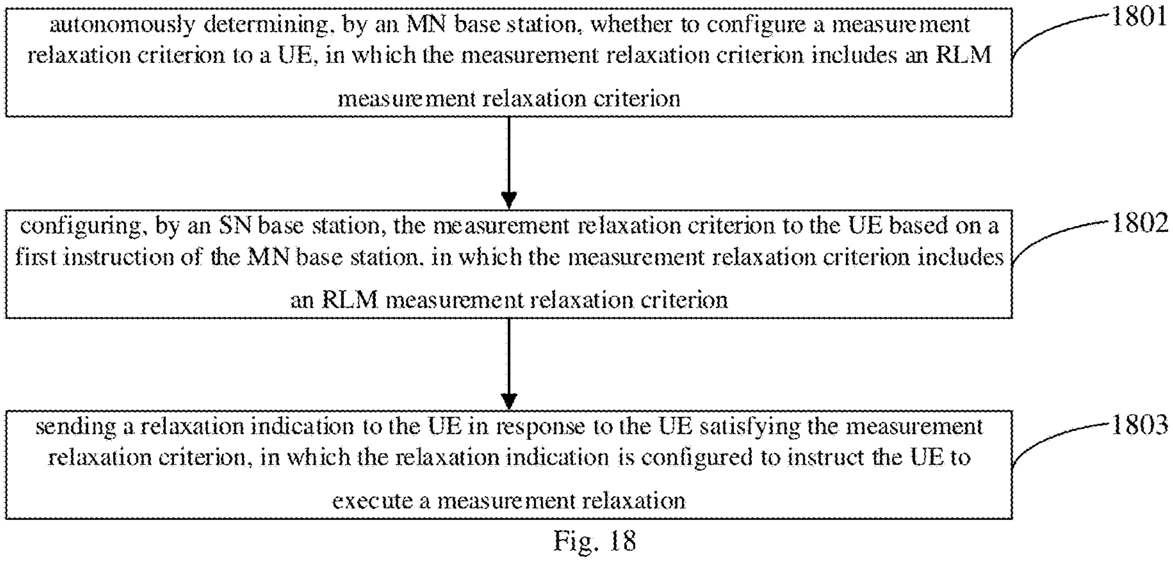
FIG. 18 is a flowchart of a measurement relaxation method provided in a further embodiment of the present disclosure.

FIG. 18 is a flowchart of a further measurement relaxation method provided in an embodiment of the present disclosure, and the method is applied to a base station group including an MN base station and an SN base station. As shown in FIG. 18, the measurement relaxation method can include the following steps.

Step 1801, the MN base station autonomously determines whether to configure a measurement relaxation criterion to a UE.

In an embodiment of the present disclosure, in an NE-DC scenario or an NR-DC scenario, the MN base station may autonomously determine whether to configure the measurement relaxation criterion to the UE.

Step 1802, the SN base station configures the measurement relaxation criterion to the UE based on a first instruction of the MN base station, in which the measurement relaxation criterion includes an RLM measurement relaxation criterion.

In an embodiment of the present disclosure, the first instruction is configured to indicate whether the SN base station configures the measurement relaxation criterion to the UE. In an embodiment of the present disclosure, the first instruction is determined by the MN base station based on auxiliary information sent by the SN base station.

Step 1803, a relaxation indication is sent to the UE in response to the UE satisfying the measurement relaxation criterion, in which the relaxation indication is configured to instruct the UE to execute a measurement relaxation.

The detailed description of steps 1801-1803 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 19:
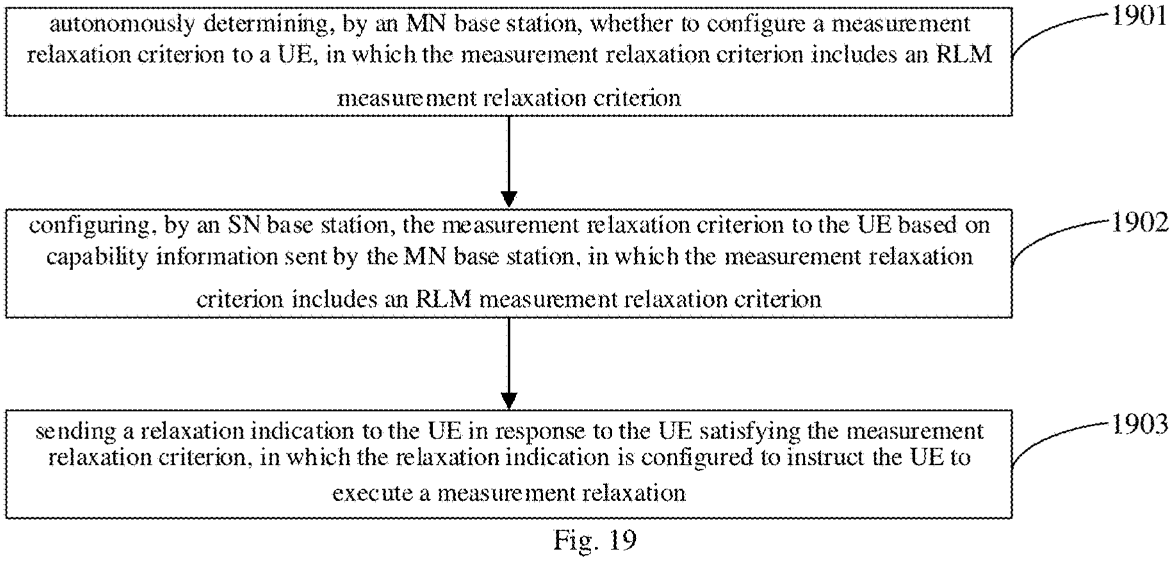
FIG. 19 is a flowchart of a measurement relaxation method provided in a further embodiment of the present disclosure.

FIG. 19 is a flowchart of a further measurement relaxation method provided in an embodiment of the present disclosure, and the method is applied to a base station group including an MN base station and an SN base station. As shown in FIG. 19, the measurement relaxation method can include the following steps.

Step 1901, the MN base station autonomously determines whether to configure a measurement relaxation criterion to a UE.

The measurement relaxation criterion includes at least one of an RLM measurement relaxation criterion, a BFD measurement relaxation criterion, and an RRM measurement relaxation criterion.

Step 1902, the SN base station configures the measurement relaxation criterion to the UE based on capability information sent by the MN base station, in which the measurement relaxation criterion includes the RLM measurement relaxation criterion.

In an embodiment of the present disclosure, the capability information can include information on whether the UE supports the measurement relaxation.

In an embodiment of the present disclosure, when the measurement relaxation criterion to be configured is different, the corresponding capability information is different. Specifically, in an embodiment of the present disclosure, if the measurement relaxation criterion to be configured is the RRM measurement relaxation criterion, the corresponding capability information sent by the MN base station to the SN base station is information on whether the UE supports the RRM measurement relaxation. In another embodiment of the present disclosure, if the measurement relaxation criterion to be configured is the RLM measurement relaxation criterion, the corresponding capability information sent by the MN base station to the SN base station is information on whether the UE supports the RLM measurement relaxation. In a further embodiment of the present disclosure, if the measurement relaxation criterion to be configured is the BFD measurement relaxation criterion, the corresponding capability information sent by the MN base station to the SN base station is information on whether the UE supports the BFD measurement relaxation criterion.

Step 1903, a relaxation indication is sent to the UE in response to the UE satisfying the measurement relaxation criterion, in which the relaxation indication is configured to instruct the UE to execute a measurement relaxation.

The detailed description of steps 1901-1903 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 20:
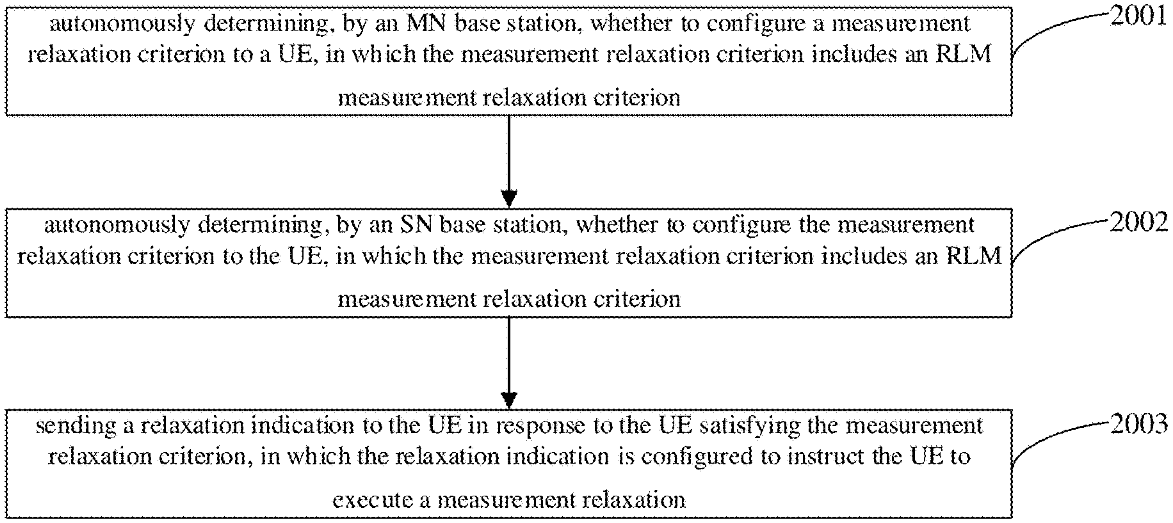
FIG. 20 is a flowchart of a measurement relaxation method provided in a further embodiment of the present disclosure.

FIG. 20 is a flowchart of a further measurement relaxation method provided in an embodiment of the present disclosure, and the method is applied to a base station group including an MN base station and an SN base station. As shown in FIG. 20, the measurement relaxation method can include the following steps.

Step 2001, the MN base station autonomously determines whether to configure a measurement relaxation criterion to a UE.

The measurement relaxation criterion includes at least one of an RLM measurement relaxation criterion, a BFD measurement relaxation criterion, or an RRM measurement relaxation criterion.

Step 2002, the SN base station autonomously determines whether to configure the measurement relaxation criterion to the UE.

In an embodiment of the present disclosure, in an EN-DC scenario or an NR-DC scenario, the SN base station may autonomously determine whether to configure the measurement relaxation criterion to the UE.

Step 2003, a relaxation indication is sent to the UE in response to the UE satisfying the measurement relaxation criterion, in which the relaxation indication is configured to instruct the UE to execute a measurement relaxation.

The detailed description of steps 2001-2003 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 21:
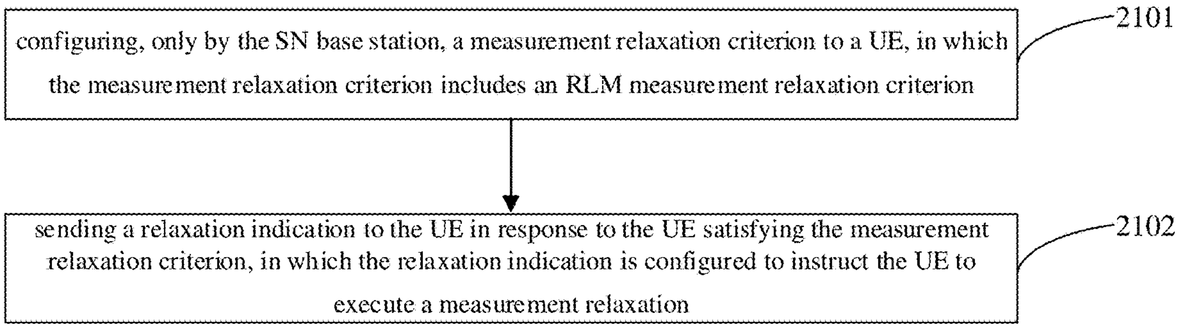
FIG. 21 is a flowchart of a measurement relaxation method provided in a further embodiment of the present disclosure.

FIG. 21 is a flowchart of a further measurement relaxation method provided in an embodiment of the present disclosure, and the method is applied to a base station group including an MN base station and an SN base station. As shown in FIG. 21, the measurement relaxation method can include the following steps.

Step 2101, only the SN base station is utilized to configure a measurement relaxation criterion to a UE.

The measurement relaxation criterion includes at least one of an RLM measurement relaxation criterion, a BFD measurement relaxation criterion, or an RRM measurement relaxation criterion.

In an embodiment of the present disclosure, in an EN-DC scenario or an NR-DC scenario, the measurement relaxation criterion may be configured to the UE only by the SN base station.

It is noted that in an embodiment of the present disclosure, when the measurement relaxation criterion is the RLM measurement relaxation criterion, in response to the MN base station not being configured with a fast MCG link recovery, then only the SN base station is utilized to configure the measurement relaxation criterion to the UE.

Step 2102, a relaxation indication is sent to the UE in response to the UE satisfying the measurement relaxation criterion, in which the relaxation indication is configured to instruct the UE to execute a measurement relaxation.

The detailed description of steps 2101-2102 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 22:
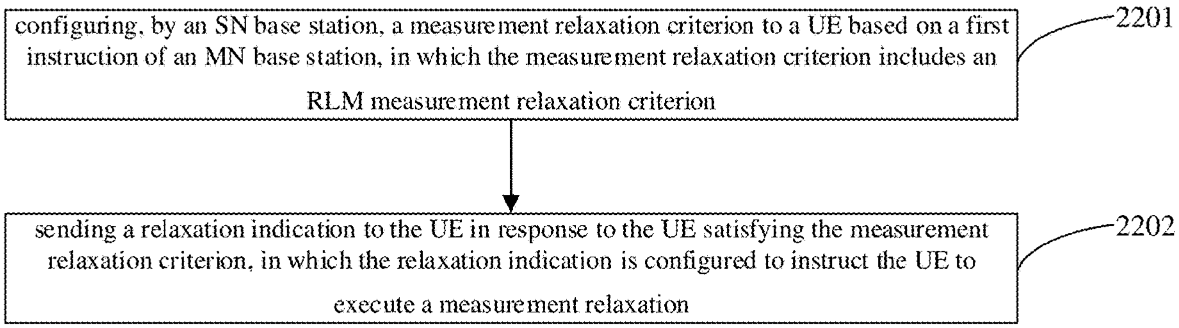
FIG. 22 is a flowchart of a measurement relaxation method provided in a further embodiment of the present disclosure.

FIG. 22 is a flowchart of a further measurement relaxation method provided in an embodiment of the present disclosure, and the method is applied to a base station group including an MN base station and an SN base station. As shown in FIG. 22, the measurement relaxation method can include the following steps.

Step 2201, only the SN base station configures a measurement relaxation criterion to a UE based on a first instruction of the MN base station.

In an embodiment of the present disclosure, the first instruction is configured to indicate whether the SN base station configures the measurement relaxation criterion to the UE.

Step 2202, a relaxation indication is sent to the UE in response to the UE satisfying the measurement relaxation criterion, in which the relaxation indication is configured to instruct the UE to execute a measurement relaxation.

The detailed description of steps 2201-2202 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 23:
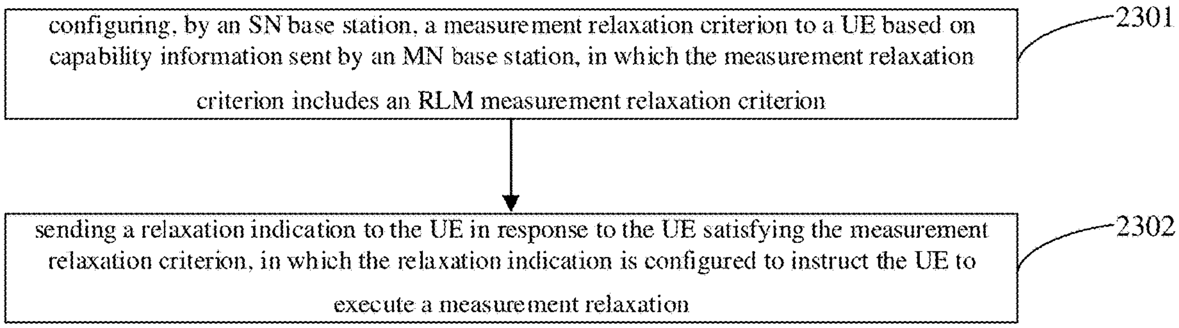
FIG. 23 is a flowchart of a measurement relaxation method provided in a further embodiment of the present disclosure.

FIG. 23 is a flowchart of a further measurement relaxation method provided in an embodiment of the present disclosure, and the method is applied to a base station group including an MN base station and an SN base station. As shown in FIG. 23, the measurement relaxation method can include the following steps.

Step 2301, only the SN base station configures a measurement relaxation criterion to a UE based on capability information sent by the MN base station.

In an embodiment of the present disclosure, the capability information includes information on whether the UE supports a measurement relaxation.

Step 2302, a relaxation indication is sent to the UE in response to the UE satisfying the measurement relaxation criterion, in which the relaxation indication is configured to instruct the UE to execute the measurement relaxation.

The detailed description of steps 2301-2302 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 24:
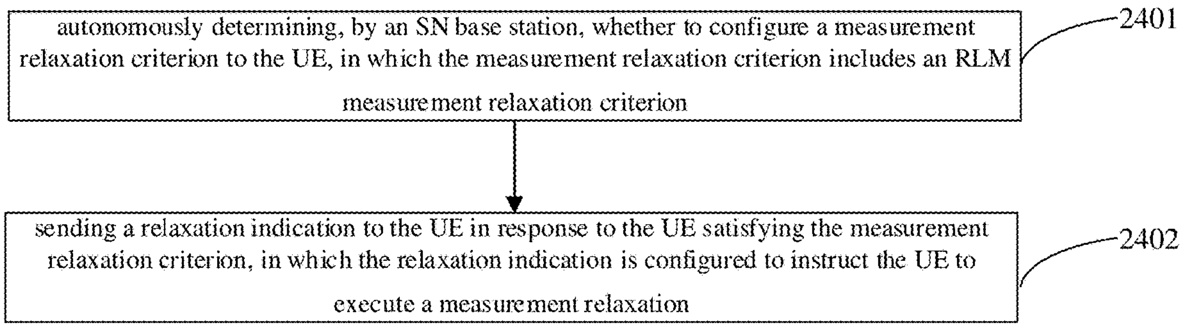
FIG. 24 is a flowchart of a measurement relaxation method provided in a further embodiment of the present disclosure.

FIG. 24 is a flowchart of a further measurement relaxation method provided in an embodiment of the present disclosure, and the method is applied to a base station group including an MN base station and an SN base station. As shown in FIG. 24, the measurement relaxation method can include the following steps.

Step 2401, only the SN base station autonomously determines whether to configure a measurement relaxation criterion to a UE.

Step 2402, a relaxation indication is sent to the UE in response to the UE satisfying the measurement relaxation criterion, in which the relaxation indication is configured to instruct the UE to execute a measurement relaxation.

The detailed description of steps 2401-2402 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 25:
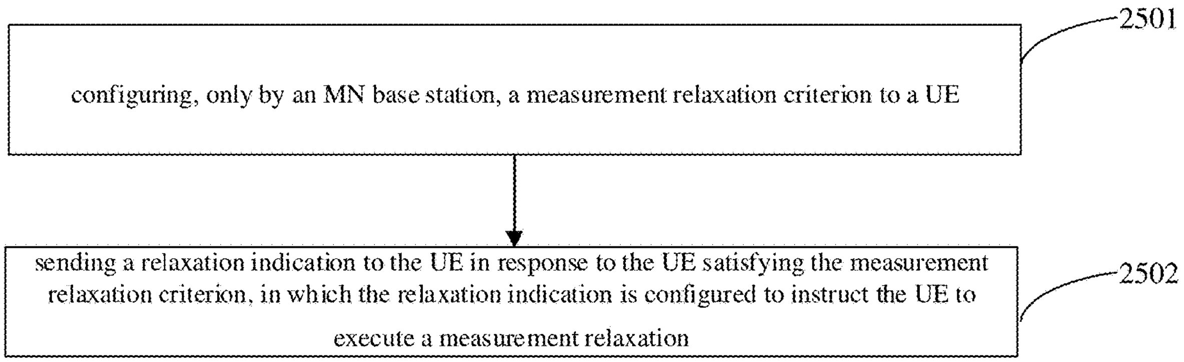
FIG. 25 is a flowchart of a measurement relaxation method provided in a further embodiment of the present disclosure.

FIG. 25 is a flowchart of a further measurement relaxation method provided in an embodiment of the present disclosure, and the method is applied to a base station group including an MN base station and an SN base station. As shown in FIG. 25, the measurement relaxation method can include the following steps.

Step 2401, only the MN base station is utilized to configure a measurement relaxation criterion to a UE The measurement relaxation criterion includes at least one of an RLM measurement relaxation criterion, a BFD measurement relaxation criterion, or an RRM measurement relaxation criterion.

In an embodiment of the present disclosure, in an NE-DC scenario or an NR-DC scenario, the measurement relaxation criterion may be configured to the UE only by the MN base station.

Step 2502, a relaxation indication is sent to the UE in response to the UE satisfying the measurement relaxation criterion, in which the relaxation indication is configured to instruct the UE to execute a measurement relaxation.

The detailed description of steps 2501-2502 can be described with reference to the above embodiments, and the embodiments of the present disclosure will not be repeated herein.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 26:
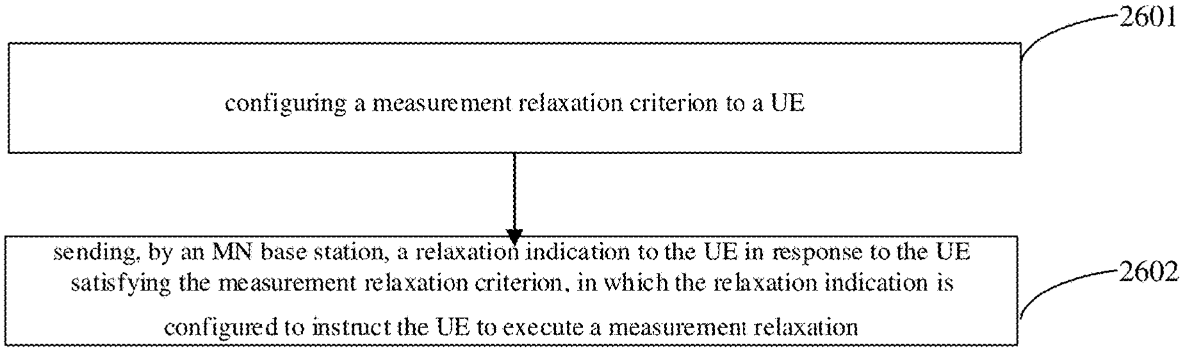
FIG. 26 is a flowchart of a measurement relaxation method provided in a further embodiment of the present disclosure.

FIG. 26 is a flowchart of a further measurement relaxation method provided in an embodiment of the present disclosure, and the method is applied to a base station group including an MN base station and an SN base station. As shown in FIG. 26, the measurement relaxation method can include the following steps.

Step 2601, a measurement relaxation criterion is configured to a UE.

The measurement relaxation criterion includes at least one of an RLM measurement relaxation criterion, a BFD measurement relaxation criterion, or an RMM measurement relaxation criterion.

Step 2602, the MN base station sends the relaxation indication to the UE in response to the UE satisfying the measurement relaxation criterion, in which the relaxation indication is configured to instruct the UE to execute a measurement relaxation.

In an embodiment of the present disclosure, the NE base station can autonomously send the relaxation indication to the UE. In another embodiment of the present disclosure, the MN base station can send the relaxation indication to the UE based on relaxation result information sent by the SN base station. The detailed description of "the MN base station sends the relaxation indication to the UE based on the relaxation result information sent by the SN base station" can be described with reference to the above embodiments, and the embodiments of the present disclosure will not be repeated herein.

It should be understood that step 2601 and step 2602 can be implemented individually or in combination, which is not limited in the present disclosure.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 27:
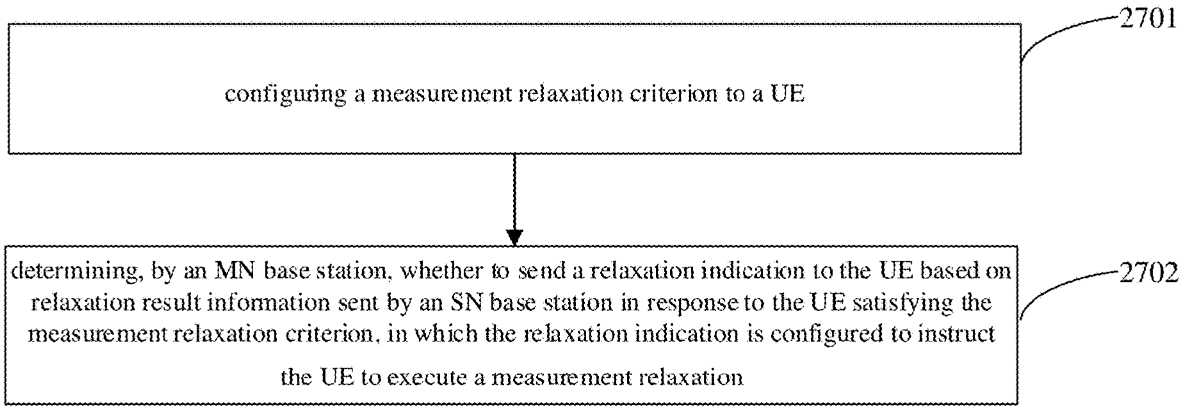
FIG. 27 is a flowchart of a measurement relaxation method provided in a further embodiment of the present disclosure.

FIG. 27 is a flowchart of a further measurement relaxation method provided in an embodiment of the present disclosure, and the method is applied to a base station group including an MN base station and an SN base station. As shown in FIG. 27, the measurement relaxation method can include the following steps.

Step 2701, a measurement relaxation criterion is configured to a UE.

The measurement relaxation criterion includes at least one of an RLM measurement relaxation criterion, a BFD measurement relaxation criterion, or an RMM measurement relaxation criterion.

Step 2702, the MN base station determines whether to send a relaxation indication to the UE based on relaxation result information sent by the SN base station in response to the UE satisfying the measurement relaxation criterion, in which the relaxation indication is configured to instruct the UE to execute a measurement relaxation.

In an embodiment of the present disclosure, the relaxation result information includes: result information that the SN base station instructs the UE to execute the measurement relaxation, or, result information that the SN base station instructs the UE not to execute the measurement relaxation.

The detailed description of steps 2701-2702 can be described with reference to the above embodiments, and the embodiments of the present disclosure will not be repeated herein.

It should be understood that step 2701 and step 2702 can be implemented separately or in combination, which is not limited in the present disclosure.

In addition, it is noted that, in an embodiment of the present disclosure, in the NE-DC and NR-DC scenarios, the MN base station can send the relaxation indication to the UE based on the relaxation result information sent by the SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 28:
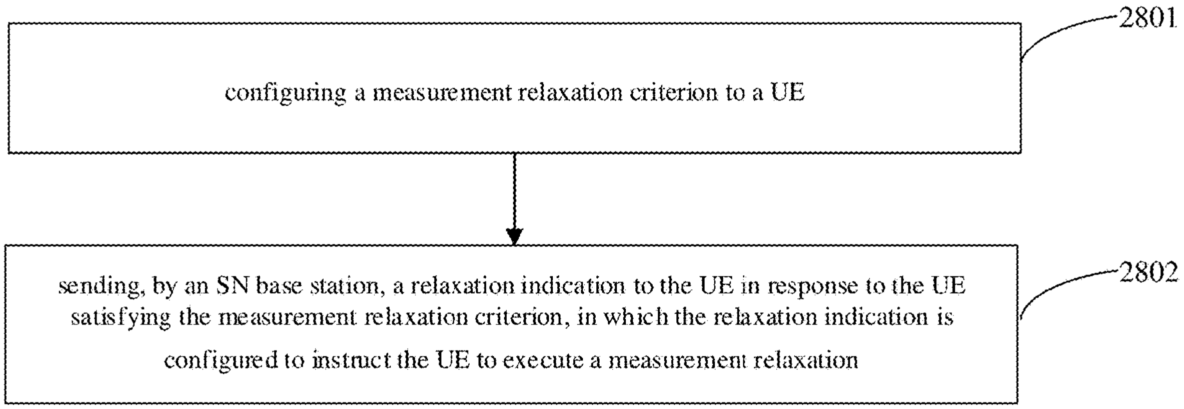
FIG. 28 is a flowchart of a measurement relaxation method provided in a further embodiment of the present disclosure.

FIG. 28 is a flowchart of a further measurement relaxation method provided in an embodiment of the present disclosure, and the method is applied to a base station group including an MN base station and an SN base station. As shown in FIG. 28, the measurement relaxation method can include the following steps.

Step 2801, a measurement relaxation criterion is configured to a UE.

The measurement relaxation criterion includes at least one of an RLM measurement relaxation criterion, a BFD measurement relaxation criterion, or an RMM measurement relaxation criterion.

Step 2802, the SN base station sends a relaxation indication to the UE in response to the UE satisfying the measurement relaxation criterion, in which the relaxation indication is configured to instruct the UE to execute a measurement relaxation.

In an embodiment of the present disclosure, the SN base station can autonomously send the relaxation indication to the UE. In another embodiment of the present disclosure, the SN base station can send the relaxation indication to the UE based on a second instruction sent by the MN base station. The detailed description of "the SN base station sends the relaxation indication to the UE based on the second instruction sent by the MN base station" can be referred to the above embodiments, and the embodiments of the present disclosure will not be repeated herein.

It should be understood that step 2801 and step 2802 can be implemented separately or in combination, which is not limited in the present disclosure.

In addition, in an embodiment of the present disclosure, in an EN-DC scenario or an NR-DC scenario, the SN base station can be utilized to send the relaxation indication to the UE.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 29:
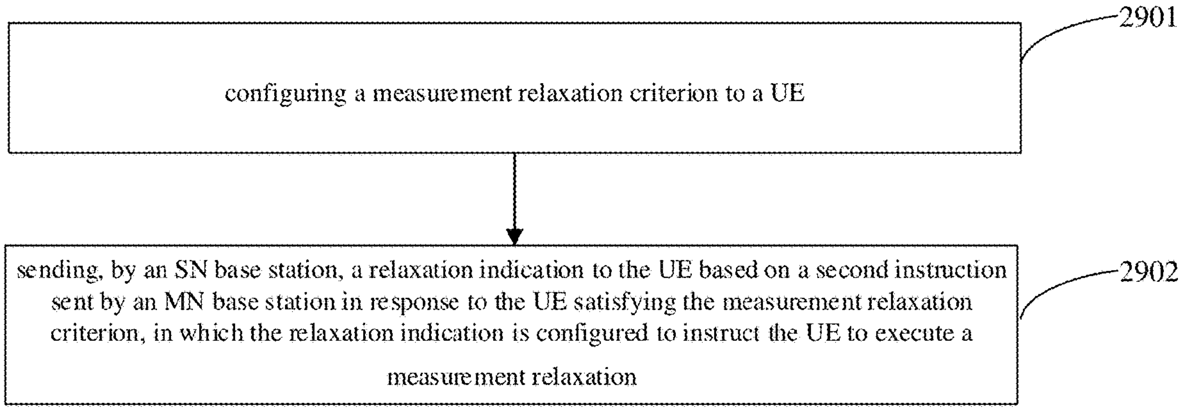
FIG. 29 is a flowchart of a measurement relaxation method provided in a further embodiment of the present disclosure.

FIG. 29 is a flowchart of a further measurement relaxation method provided in an embodiment of the present disclosure, and the method is applied to a base station group including an MN base station and an SN base station. As shown in FIG. 29, the measurement relaxation method can include the following steps.

Step 2901, a measurement relaxation criterion is configured to a UE.

The measurement relaxation criterion includes at least one of an RLM measurement relaxation criterion, a BFD measurement relaxation criterion, or an RMM measurement relaxation criterion.

Step 2902, the SN base station sends a relaxation indication to the UE based on a second instruction sent by the MN base station in response to the UE satisfying the measurement relaxation criterion, in which the relaxation indication is configured to instruct the UE to execute a measurement relaxation.

In an embodiment of the present disclosure, the second instruction is configured to instruct the SN base station to send the relaxation indication to the UE, or, the SN base station not to send the relaxation indication to the UE.

In addition, the detailed description of steps 2901-2902 can be described with reference to the above embodiments, and the embodiments of the present disclosure will not be repeated herein.

It should be understood that step 2901 and step 2902 can be implemented separately or in combination, which is not limited in the present disclosure.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 30:
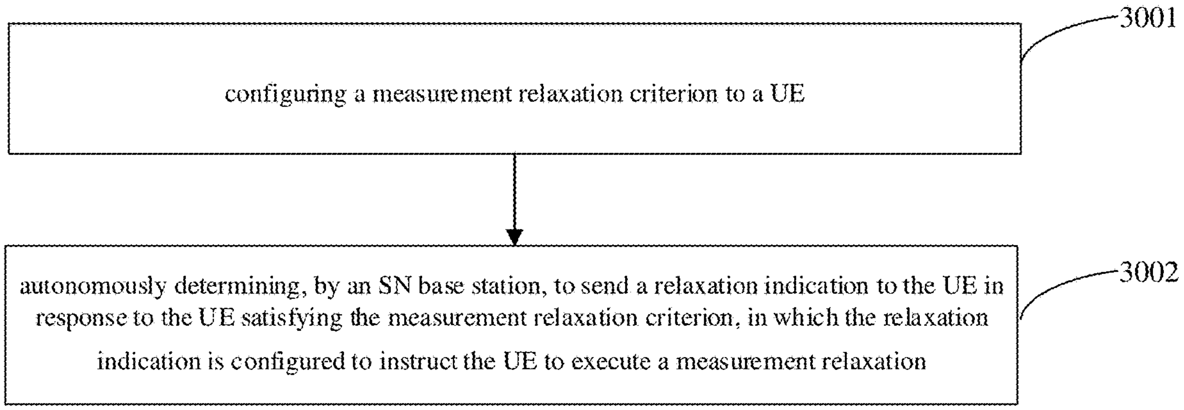
FIG. 30 is a flowchart of a measurement relaxation method provided in a further embodiment of the present disclosure.

FIG. 30 is a flowchart of a further measurement relaxation method provided in an embodiment of the present disclosure, and the method is applied to a base station group including an MN base station and an SN base station. As shown in FIG. 30, the measurement relaxation method can include the following steps.

Step 3001, a measurement relaxation criterion is configured to a UE.

The measurement relaxation criterion includes at least one of an RLM measurement relaxation criterion, a BFD measurement relaxation criterion, or an RMM measurement relaxation criterion.

Step 3002, the SN base station autonomously determines to send a relaxation indication to the UE in response to the UE satisfying the measurement relaxation criterion, in which the relaxation indication is configured to instruct the UE to execute a measurement relaxation.

In addition, the detailed description of steps 3001-3002 can be described with reference to the above embodiments, and the embodiments of the present disclosure will not be repeated herein.

It should be understood that step 3001 and step 3002 can be implemented separately or in combination, which is not limited in the present disclosure.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 31A:
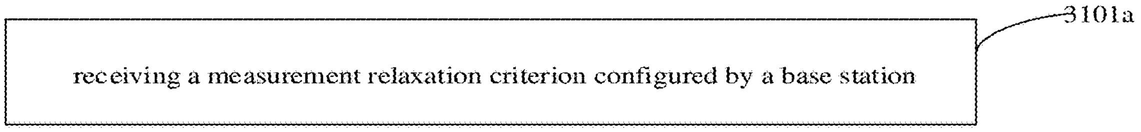
FIG. 31*a* is a flowchart of a measurement relaxation method provided in a further embodiment of the present disclosure.

FIG. 31*a* is a flowchart of a further measurement relaxation method provided in an embodiment of the present disclosure, and the method is applied to a UE. As shown in FIG. 31*a*, the measurement relaxation method can include the following steps.

Step 3101*a*, a measurement relaxation criterion configured by a base station is received.

In an embodiment of the present disclosure, the measurement relaxation criterion can include at least one of the following:

an RLM measurement relaxation criterion;

a BFD measurement relaxation criterion; or an RRM measurement relaxation criterion.

As well as, in an embodiment of the present disclosure, the above measurement relaxation criterion is a cell-specific measurement relaxation criterion.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 31B:
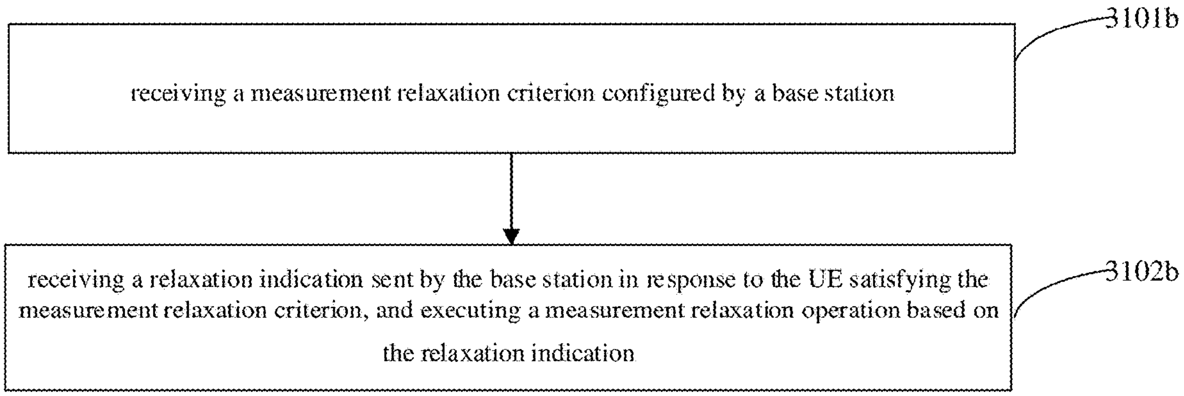
FIG. 31*b* is a flowchart of a measurement relaxation method provided in a further embodiment of the present disclosure.

FIG. 31*b* is a flowchart of a further measurement relaxation method provided in an embodiment of the present disclosure, and the method is applied to a UE. As shown in FIG. 31*b*, the measurement relaxation method can include the following steps.

Step 3101*b*, a measurement relaxation criterion configured by a base station is received.

In an embodiment of the present disclosure, the measurement relaxation criterion can include at least one of the following:

an RLM measurement relaxation criterion;

a BFD measurement relaxation criterion; or an RRM measurement relaxation criterion.

As well as, in an embodiment of the present disclosure, the above measurement relaxation criterion is a cell-specific measurement relaxation criterion.

Step 3102*b*, a relaxation indication sent by the base station is received in response to the UE satisfying the measurement relaxation criterion, and a measurement relaxation operation is executed based on the relaxation indication.

In an embodiment of the present disclosure, the above relaxation indication is a cell-specific relaxation indication.

In an embodiment of the present disclosure, the UE can receive the relaxation indication sent by an MN base station. In another embodiment of the present disclosure, the UE can receive the relaxation indication sent by an SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 32:
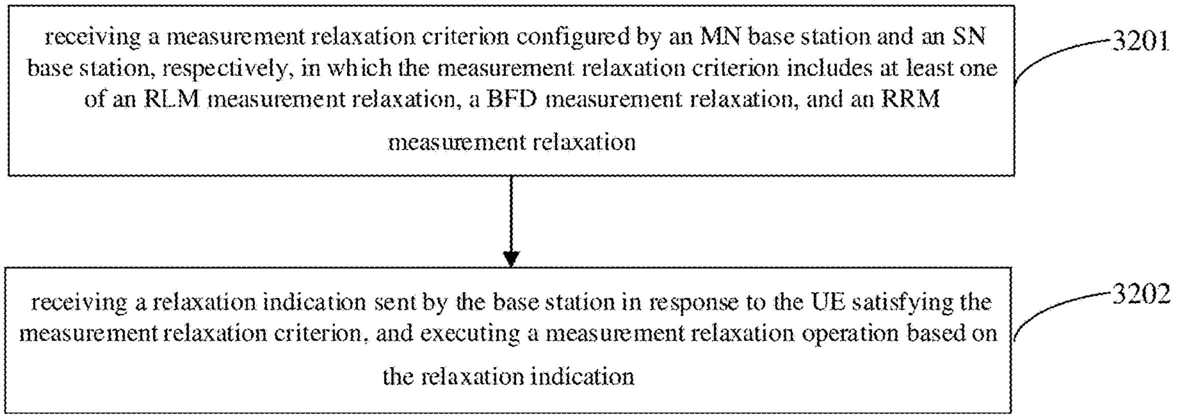
FIG. 32 is a flowchart of a measurement relaxation method provided in a further embodiment of the present disclosure.

FIG. 32 is a flowchart of a further measurement relaxation method provided in an embodiment of the present disclosure, and the method is applied to a UE. As shown in FIG. 32, the measurement relaxation method can include the following steps.

Step 3201, a measurement relaxation criterion configured by an MN base station and an SN base station respectively is received, in which the measurement relaxation criterion includes at least one of an RLM measurement relaxation criterion, a BFD measurement relaxation criterion, or an RRM measurement relaxation criterion.

Step 3202, a relaxation indication sent by the base station is received in response to the UE satisfying the measurement relaxation criterion, and a measurement relaxation operation is executed based on the relaxation indication.

In an embodiment of the present disclosure, the UE can receive the relaxation indication sent by the MN base station. In another embodiment of the present disclosure, the UE can receive the relaxation indication sent by the SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 33:
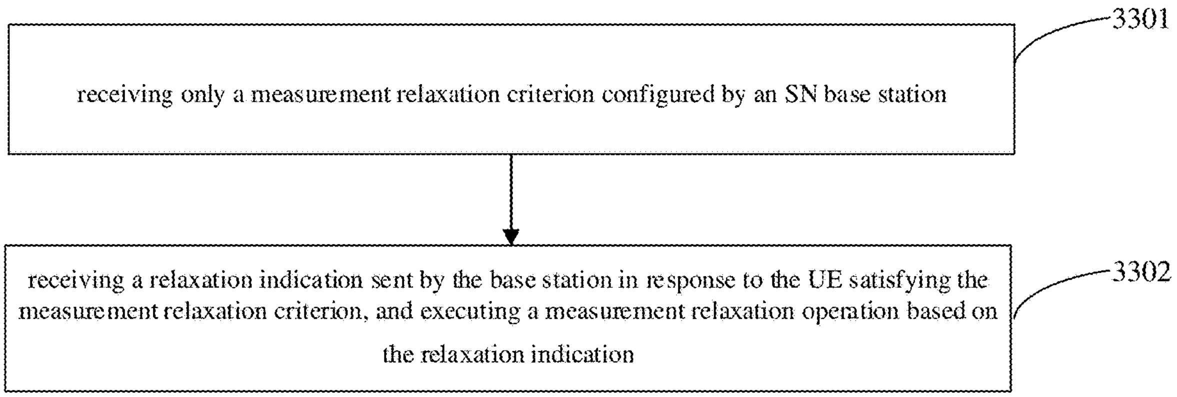
FIG. 33 is a flowchart of a measurement relaxation method provided in a further embodiment of the present disclosure.

FIG. 33 is a flowchart of a further measurement relaxation method provided in an embodiment of the present disclosure, and the method is applied to a UE. As shown in FIG. 33, the measurement relaxation method can include the following steps.

Step 3301, only a measurement relaxation criterion configured by an SN base station is received.

The measurement relaxation criterion includes at least one of an RLM measurement relaxation criterion, a BFD measurement relaxation criterion, or an RRM measurement relaxation criterion.

Step 3302, a relaxation indication sent by a base station is received in response to the UE satisfying the measurement relaxation criterion, and a measurement relaxation operation is executed based on the relaxation indication.

In an embodiment of the present disclosure, the UE can receive the relaxation indication sent by an MN base station. In another embodiment of the present disclosure, the UE can receive the relaxation indication sent by the SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 34:
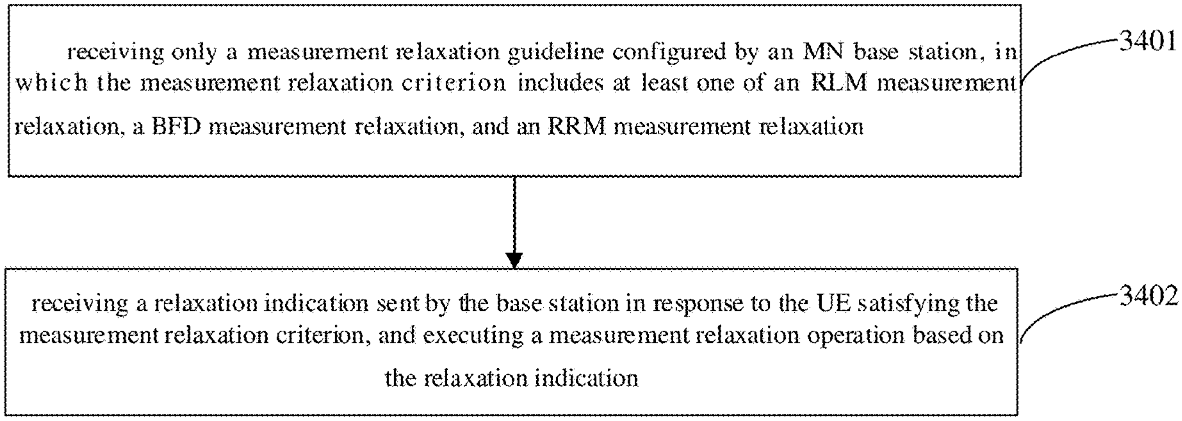
FIG. 34 is a flowchart of a measurement relaxation method provided in a further embodiment of the present disclosure.

FIG. 34 is a flowchart of a further measurement relaxation method provided in an embodiment of the present disclosure, and the method is applied to a UE. As shown in FIG. 34, the measurement relaxation method can include the following steps.

Step 3401, only a measurement relaxation criterion configured by an MN base station is received.

The measurement relaxation criterion includes at least one of an RLM measurement relaxation criterion, a BFD measurement relaxation criterion, or an RRM measurement relaxation criterion.

Step 3402, a relaxation indication sent by the base station is received in response to the UE satisfying the measurement relaxation criterion, and a measurement relaxation operation is executed based on the relaxation indication.

In an embodiment of the present disclosure, the UE can receive the relaxation indication sent by the MN base station. In another embodiment of the present disclosure, the UE can receive the relaxation indication sent by an SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 35:
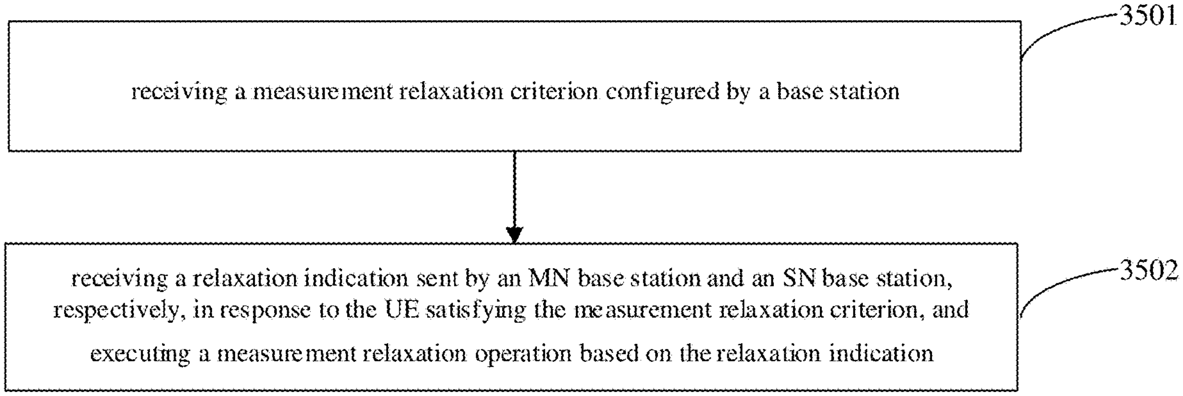
FIG. 35 is a flowchart of a measurement relaxation method provided in a further embodiment of the present disclosure.

FIG. 35 is a flowchart of a further measurement relaxation method provided in an embodiment of the present disclosure, and the method is applied to a UE. As shown in FIG. 35, the measurement relaxation method can include the following steps.

Step 3501, a measurement relaxation criterion configured by a base station is received.

Step 3502, the relaxation indication sent by an MN base station and an SN base station, respectively is received in response to the UE satisfying the measurement relaxation criterion, and a measurement relaxation operation is executed based on the relaxation indication.

In an embodiment of the present disclosure, the UE can receive the relaxation indication sent by the MN base station. In another embodiment of the present disclosure, the UE can receive the relaxation indication sent by the SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 36:
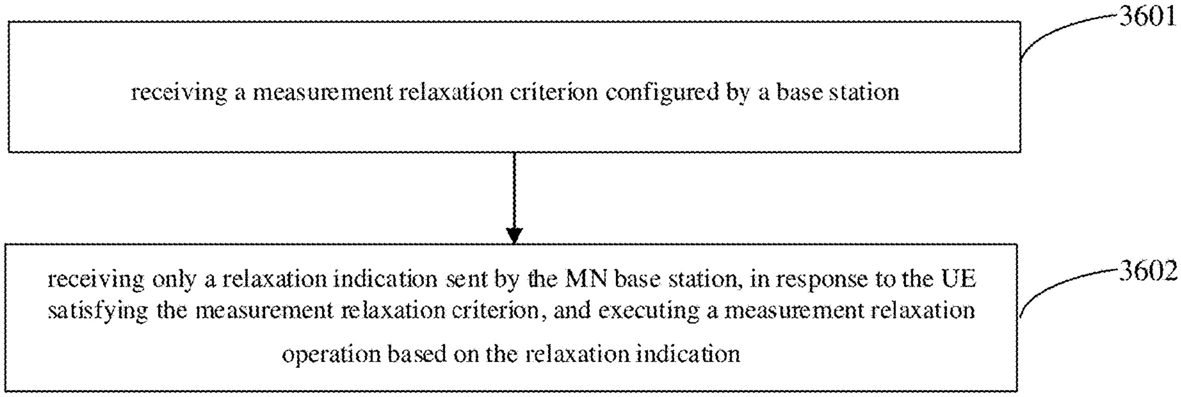
FIG. 36 is a flowchart of a measurement relaxation method provided in a further embodiment of the present disclosure.

FIG. 36 is a flowchart of a further measurement relaxation method provided in an embodiment of the present disclosure, and the method is applied to the UE. As shown in FIG. 36, the measurement relaxation method can include the following steps.

Step 3601, a measurement relaxation criterion configured by a base station is received.

Step 3602, only a relaxation indication sent by an MN base station is received, in response to the UE satisfying the measurement relaxation criterion, and a measurement relaxation operation is executed based on the relaxation indication.

In an embodiment of the present disclosure, the UE can receive the relaxation indication sent by the MN base station. In another embodiment of the present disclosure, the UE can receive the relaxation indication sent by an SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 37:
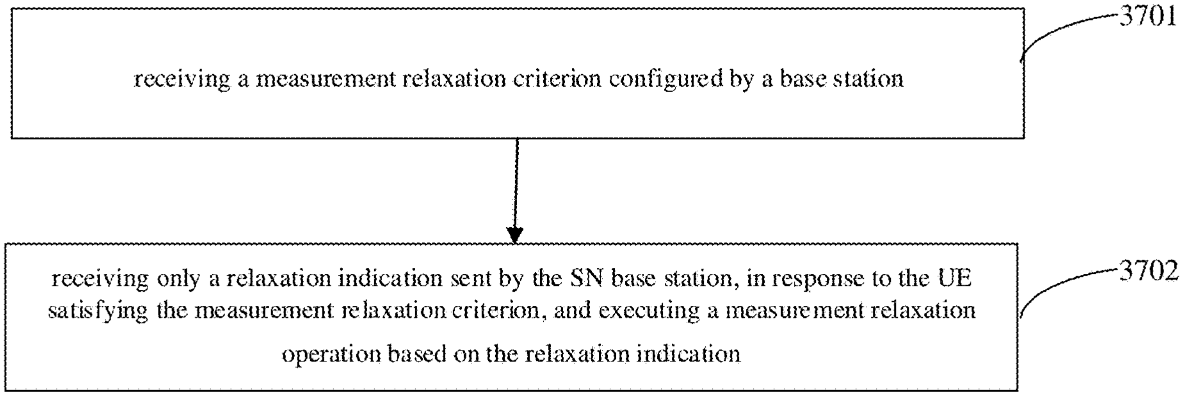
FIG. 37 is a flowchart of a measurement relaxation method provided in a further embodiment of the present disclosure.

FIG. 37 is a flowchart of a further measurement relaxation method provided in an embodiment of the present disclosure, and the method is applied to a UE. As shown in FIG. 37, the measurement relaxation method can include the following steps.

Step 3701, a measurement relaxation criterion configured by a base station is received.

Step 3702, only a relaxation indication sent by an SN base station is received, in response to the UE satisfying the measurement relaxation criterion, and a measurement relaxation operation is executed based on the relaxation indication.

In an embodiment of the present disclosure, the UE can receive the relaxation indication sent by an MN base station. In another embodiment of the present disclosure, the UE can receive the relaxation indication sent by the SN base station.

In summary, in the measurement relaxation method provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

Figure 38:
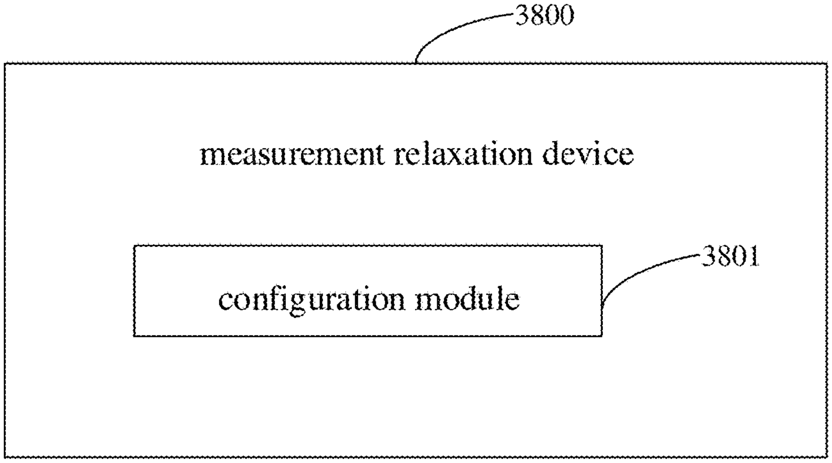
FIG. 38 is a block diagram of a measurement relaxation device provided in an embodiment of the present disclosure.

FIG. 38 is a block diagram of a measurement relaxation device provided by an embodiment of the present disclosure. As shown in FIG. 38, the device 3800 can include: a configuration module 3801.

The configuration module 3801 is configured for configuring a measurement relaxation criterion to a UE.

In summary, in the measurement relaxation device provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

In an embodiment of the present disclosure, the measurement relaxation criterion includes at least one of the following:

an RLM measurement relaxation criterion;

a BFD measurement relaxation criterion; or an RRM measurement relaxation criterion.

Further, in another embodiment of the present disclosure, the device is further configured to:

send a first instruction to an SN base station, in which the first instruction is configured to instruct the SN base station to configure the measurement relaxation criterion to the UE, or, the SN base station not to configure the measurement relaxation criterion to the UE;

and/or, send capability information to the SN base station, in which the capability information includes information on whether the UE supports the RLM measurement relaxation.

Further, in another embodiment of the present disclosure, the device is further configured to:

send a first instruction to an SN base station to cause the SN base station to configure the measurement relaxation criterion to the UE based on the first instruction, in which the first instruction is configured to instruct the SN base station to configure the measurement relaxation criterion to the UE, or, the SN base station not to configure the measurement relaxation criterion to the UE;

and/or, send capability information to an SN base station to cause the SN base station to configure the measurement relaxation criterion to the UE based on the capability information, in which the capability information includes information on whether the UE supports an RLM measurement relaxation.

Further, in another embodiment of the present disclosure, the device is further configured to:

obtain auxiliary information sent by the SN base station;

send the first instruction to the SN base station based on the auxiliary information.

Further, in another embodiment of the present disclosure, the device is further configured to:

send a relaxation indication to the UE in response to the UE satisfying the measurement relaxation criterion, in which the relaxation indication is configured to instruct the UE to execute a measurement relaxation.

Further, in another embodiment of the present disclosure, the device is further configured to:

obtain relaxation result information sent by the SN base station, in which the relaxation result information includes result information that the SN base station instructs the UE to execute the measurement relaxation, or, result information that the SN base station instructs the UE not to execute the measurement relaxation; and decide whether to send the relaxation indication to the UE based on the relaxation result information.

Further, in another embodiment of the present disclosure, the device is further configured to:

send a second instruction to the SN base station, in which the second instruction is configured to instruct the SN base station to send a relaxation indication to the UE, or, the SN base station not to send a relaxation indication to the UE.

Further, in another embodiment of the present disclosure, the measurement relaxation criterion is a cell-specific measurement relaxation criterion.

Further, in another embodiment of the present disclosure, the relaxation indication is a cell-specific relaxation indication.

Figure 39:
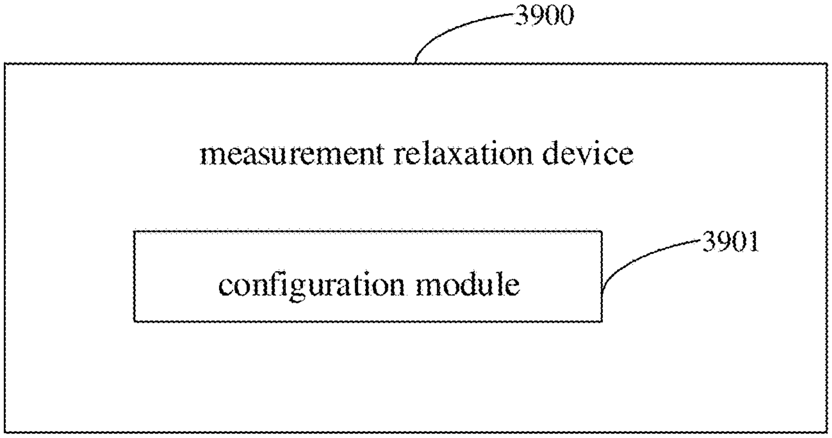
FIG. 39 is a block diagram of a measurement relaxation device provided in another embodiment of the present disclosure.

FIG. 39 is a block diagram of a measurement relaxation device provided by an embodiment of the present disclosure. As shown in FIG. 39, the device 3900 can include: a configuration module 3901.

The configuration module 3901 is configured for configuring a measurement relaxation criterion to a UE.

In summary, in the measurement relaxation device provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

In an embodiment of the present disclosure, the measurement relaxation criterion includes at least one of the following:

an RLM measurement relaxation criterion;

a BFD measurement relaxation criterion; or an RRM measurement relaxation criterion.

Further, in another embodiment of the present disclosure, the configuration module 3901 is further configured to:

obtain a first instruction sent by an MN base station, and configure the measurement relaxation criterion to the UE based on the first instruction, in which the first instruction is configured to indicate whether the SN base station configures the measurement relaxation criterion to the UE; and/or, obtain capability information sent by the MN base station, and configure the measurement relaxation criterion to the UE based on the capability information, in which the capability information includes information on whether the UE supports an RLM measurement relaxation; and/or, autonomously configure, by the SN base station, the measurement relaxation criterion to the UE.

Further, in another embodiment of the present disclosure, the configuration module is further configured to:

send auxiliary information to the MN base station;

obtain the first instruction sent by the MN base station.

Further, in another embodiment of the present disclosure, the device is further configured to:

send a relaxation indication to the UE in response to the UE satisfying the measurement relaxation criterion, in which the relaxation indication is configured to instruct the UE to execute a measurement relaxation.

Further, in another embodiment of the present disclosure, the above device is further configured to:

obtain a second instruction sent by the MN base station, and send the relaxation indication to the UE based on the second instruction, in which the second instruction is configured to instruct the SN base station to send the relaxation indication to the UE, or, the SN base station not to send the relaxation indication to the UE; and/or, autonomously send, by the SN base station, the relaxation indication to the UE.

Further, in another embodiment of the present disclosure, the above device is further configured to:

send relaxation result information to the MN base station, in which the relaxation result information includes result information that the SN base station instructs the UE to execute the measurement relaxation, or, result information that the SN base station instructs the UE not to execute the measurement relaxation.

Further, in another embodiment of the present disclosure, the measurement relaxation criterion is a cell-specific measurement relaxation criterion.

Further, in another embodiment of the present disclosure, the relaxation indication is a cell-specific relaxation indication.

Figure 40:
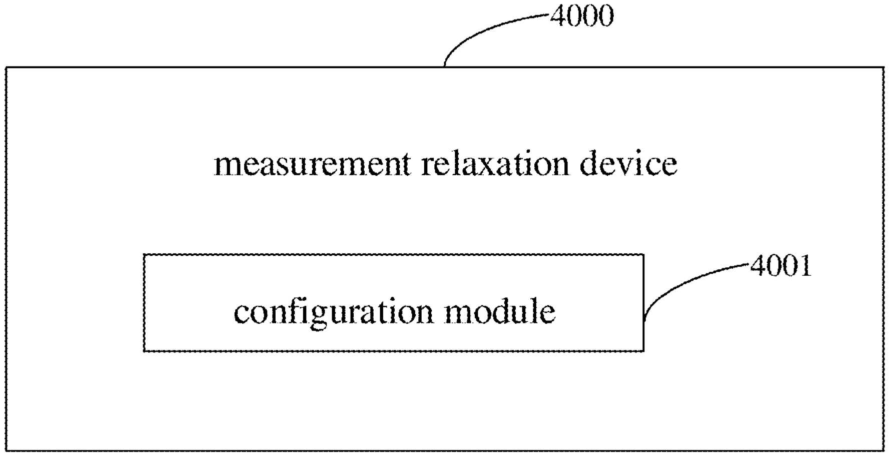
FIG. 40 is a block diagram of a measurement relaxation device provided in an embodiment of the present disclosure.

FIG. 40 is a block diagram of a measurement relaxation device provided by an embodiment of the present disclosure. As shown in FIG. 40, the device 4000 can include: a configuration module 4001.

The configuration module 4001 is configured for configuring a measurement relaxation criterion to a UE.

In summary, in the measurement relaxation device provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

In an embodiment of the present disclosure, the measurement relaxation criterion includes at least one of the following:

an RLM measurement relaxation criterion;

a BFD measurement relaxation criterion; or an RRM measurement relaxation criterion.

Further, in another embodiment of the present disclosure, the above configuration module 4001 is further configured to:

configure the measurement relaxation criterion to the UE by the MN base station and the SN base station, respectively; and/or, configure the measurement relaxation criterion to the UE only by the SN base station; and/or, configure the measurement relaxation criterion to the UE only by the MN base station.

Further, in another embodiment of the present disclosure, the above configuration module 4001 is further configured to:

autonomously determine, by the MN base station, whether to configure the measurement relaxation criterion to the UE;

configure, by the SN base station, the measurement relaxation criterion to the UE based on a first instruction of the MN base station, in which the first instruction is configured to indicate whether the SN base station configures the measurement relaxation criterion to the UE.

Further, in another embodiment of the present disclosure, the above configuration module 4001 is further configured to:

autonomously determine, by the MN base station, whether to configure the measurement relaxation criterion to the UE;

configure, by the SN base station, the measurement relaxation criterion to the UE based on capability information sent by the MN base station, in which the capability information includes information on whether the UE supports an RLM measurement relaxation.

Further, in another embodiment of the present disclosure, the above configuration module 4001 is further configured to:

autonomously determine, by the MN base station, whether to configure the measurement relaxation criterion to the UE; and autonomously determine, by the SN base station, whether to configure the measurement relaxation criterion to the UE.

Further, in another embodiment of the present disclosure, the above configuration module 4001 is further configured to:

configure, by the SN base station, the measurement relaxation criterion to the UE based on a first instruction of the MN base station, in which the first instruction is configured to indicate whether the SN base station configures the measurement relaxation criterion to the UE;

configure, by the SN base station, the measurement relaxation criterion to the UE based on capability information sent by the MN base station, in which the capability information includes information on whether the UE supports an RLM measurement relaxation; and autonomously determine, by the SN base station, whether to configure the measurement relaxation criterion to the UE.

Further, in another embodiment of the present disclosure, the first instruction is determined by the MN base station based on auxiliary information sent by the SN base station.

Further, in another embodiment of the present disclosure, the measurement relaxation criterion is a cell-specific measurement relaxation criterion.

Further, in another embodiment of the present disclosure, the device is further configured to:

send a relaxation indication to the UE in response to the UE satisfying the measurement relaxation criterion, in which the relaxation indication is configured to instruct the UE to execute a measurement relaxation.

Further, in another embodiment of the present disclosure, the device is further configured to:

send, by the MN base station, the relaxation indication to the UE; and/or, send, by the SN base station, the relaxation indication to the UE Further, in another embodiment of the present disclosure, the device is further configured to:

determine, by the MN base station, whether to send the relaxation indication to the UE based on relaxation result information sent by the SN base station, in which the relaxation result information includes: result information that the SN base station instructs the UE to execute the measurement relaxation, or, result information that the SN base station instructs the UE not to execute the measurement relaxation.

Further, in another embodiment of the present disclosure, the device is further configured to:

send, by the SN base station, the relaxation indication to the UE based on a second instruction sent by the MN base station, in which the second instruction is configured to instruct the SN base station to send the relaxation indication to the UE, or, the SN base station not to send the relaxation indication to the UE; and/or, autonomously determine, by the SN base station, to send the relaxation indication to the UE.

Further, in another embodiment of the present disclosure, the relaxation indication is a cell-specific relaxation indication.

Figure 41:
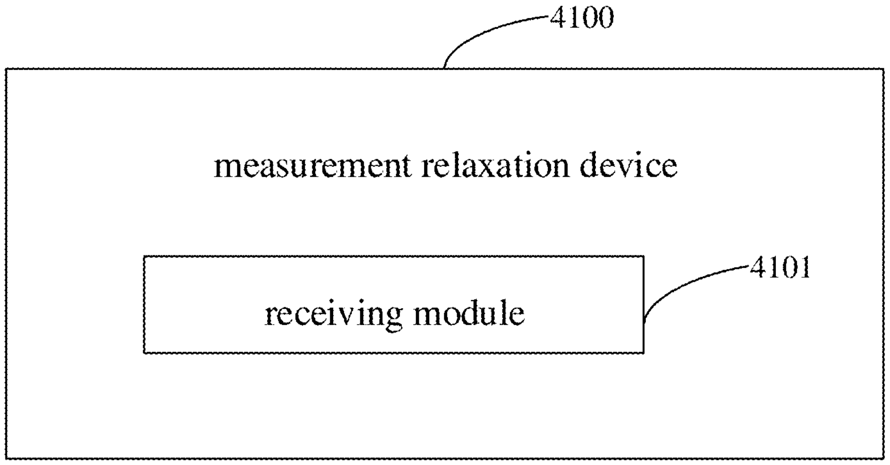
FIG. 41 is a block diagram of a measurement relaxation device provided in another embodiment of the present disclosure.

FIG. 41 is a block diagram of a measurement relaxation device provided by an embodiment of the present disclosure. As shown in FIG. 41, the device 4100 can include: a receiving module 4101.

The receiving module 4101 is configured for receiving a measurement relaxation criterion configured by a base station.

In summary, in the measurement relaxation device provided by the embodiments of the present disclosure, both the MN base station and the SN base station can configure the measurement relaxation criterion to the UE, or only the MN base station configures the measurement relaxation criterion to the UE, or only the SN base station configures the measurement relaxation criterion to the UE. Therefore, the present disclosure provides a method for configuring the measurement relaxation criterion. In addition, in the embodiments of the present disclosure, both the MN base station and the SN base station can send a measurement relaxation indication to the UE to instruct the UE to execute a measurement relaxation. Therefore, the present disclosure also provides a method for indicating the measurement relaxation.

In an embodiment of the present disclosure, the measurement relaxation criterion includes at least one of the following:

an RLM measurement relaxation criterion;

a BFD measurement relaxation criterion; or an RRM measurement relaxation criterion.

Further, in another embodiment of the present disclosure, the above receiving module 4101 is further configured to:

receive the measurement relaxation criterion configured by an MN base station and an SN base station, respectively; and/or, receive only the measurement relaxation criterion configured by the MN base station; and/or, receive only the measurement relaxation criterion configured by the SN base station.

Further, in another embodiment of the present disclosure, the device is further configured to:

receive a relaxation indication sent by a base station in response to the UE satisfying the measurement relaxation criterion, and execute a measurement relaxation operation based on the relaxation indication.

Further, in another embodiment of the present disclosure, the above device is further configured to:

receive the relaxation indication sent by an MN base station and an SN base station, respectively; and/or, receive only the relaxation indication sent by the MN base station; and/or, receive only the relaxation indication sent by the SN base station.

Further, in an embodiment of the present disclosure, the measurement relaxation criterion is a cell-specific measurement relaxation criterion.

Further, in an embodiment of the present disclosure, the relaxation indication is a cell-specific relaxation indication.

Figure 42:
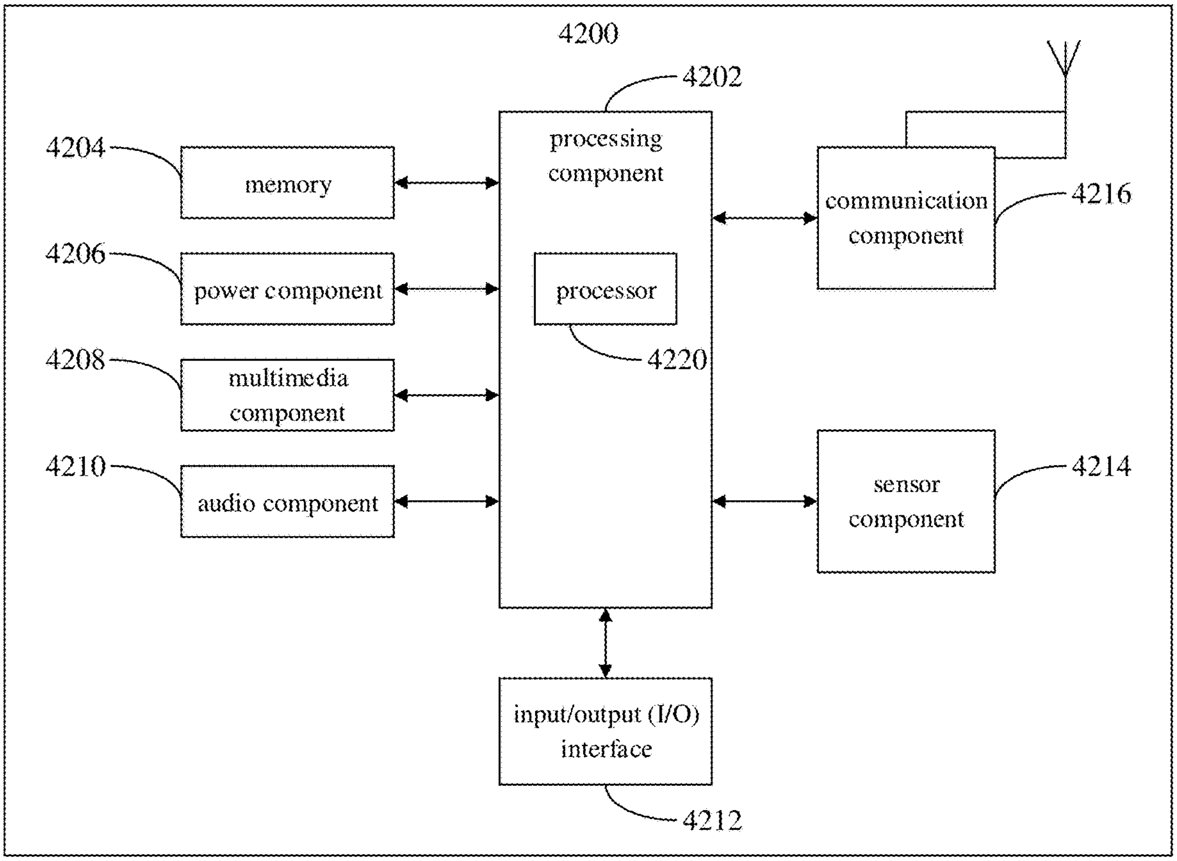
FIG. 42 is a block diagram of a user equipment provided in an embodiment of the present disclosure.

FIG. 42 is a block diagram of a user equipment (UE) 4200 provided in an embodiment of the present disclosure. For example, the UE 4200 can be a mobile phone, a computer, a digital broadcasting terminal, a message sending and receiving equipment, a game console, a tablet equipment, a medical equipment, a fitness equipment, a personal digital assistant, etc.

Referring to FIG. 42, the UE 4200 can include one or more of following components: a processing component 4202, a memory 4204, a power component 4206, a multimedia component 4208, an audio component 4210, an input/output (I/O) interface 4212, a sensor component 4214 and a communication component 4216.

The processing component 4202 typically controls the overall operation of the UE 4200, such as operations associated with display, telephone calls, data communication, camera operations, and recording operations. The processing component 4202 can include one or more processors 4220 to execute instructions to complete all or part of the steps of the above method. In addition, the processing component 4202 can include one or more modules to facilitate the interaction between the processing component 4202 and other components. For example, the processing component 4202 can include a multimedia module to facilitate interaction between the multimedia component 4208 and the processing component 4202.

The memory 4204 is configured to store various types of data to support operations on the UE 4200. Examples of these data include instructions for any application program or method operated on the UE 4200, contact data, phone book data, messages, images, videos, etc. The memory 4204 can be implemented by any type of volatile or non-volatile storage equipment or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc.

The power component 4206 provides power to various components of the UE 4200. The power component 4206 can include a power management system, at least one power supply, and other components associated with generating, managing, and distributing power for the UE 4200.

The multimedia component 4208 includes a screen providing an output interface between the UE 4200 and a user. In some embodiments, the screen can include a liquid crystal display (LCD) and a touch panel (TP). If the screen includes the touch panel, the screen can be implemented as a touch screen to receive input signals from the user. The touch panel includes at least one touch sensor to sense touches, slides and gestures on the touch panel. The touch sensor can not only sense the boundaries of the touch or slide action, but also detect the wake-up time and pressure associated with the touch or slide operation. In some embodiments, the multimedia component 4208 includes a front camera and/or a rear camera. The front camera and/or the rear camera can receive external multimedia data when the UE 4200 is in an operating mode, such as a shooting mode or a video mode. Each front camera and rear camera can be a fixed optical lens system or have a focal length and an optical zoom capability.

The audio component 4210 is configured to output and/or input audio signals. For example, the audio component 4210 includes a microphone (MIC) that is configured to receive external audio signals when the UE 4200 is in the operating mode, such as a call mode, a recording mode, and a speech recognition mode. The received audio signals can be further stored in the memory 4204 or transmitted through the communication component 4216. In some embodiments, the audio component 4210 further includes a speaker for outputting the audio signals.

The input/output (I/O) interface 4212 provides an interface between the processing component 4202 and a peripheral interface module, the peripheral interface module can be a keypad, a click wheel, a button, and the like. These buttons can include, but are not limited to, a home button, a volume button, a start button, and a lock button.

The sensor component 4214 includes at least one sensor for providing state assessments of various aspects for the UE 4200. For example, the sensor component 4214 can detect the on/off state of the equipment 800, the relative positioning of components, such as a display and a keypad of the UE 4200. The sensor component 4214 can also detect the position change of the UE 4200 or a component of the UE 4200, the presence or absence of user contact with the UE 4200, the orientation or acceleration/deceleration of the UE 4200 and the temperature change of the UE 4200. The sensor component 4214 can include a proximity sensor configured to detect the presence of a nearby object without any physical contact. The sensor component 4214 can also include an optical sensor, such as a CMOS or CCD image sensor, for use in imaging applications. In some embodiments, the sensor component 4214 can also include an acceleration sensor, a gyroscope sensor, a magnetic sensor, a pressure sensor, or a temperature sensor.

The communication component 4216 is configured to facilitate wired or wireless communication between the UE 4200 and other apparatuses. The UE 4200 can access to a wireless network based on a communication standard, such as Wi-Fi, 2G or 3G, or a combination thereof. In an embodiment, the communication component 4216 receives broadcast signals or broadcast-related information from an external broadcast management system via a broadcast channel. In an embodiment, the communication component 4216 further includes a near field communication (NFC) module to facilitate short range communication. For example, NFC modules can be implemented based on Radio Frequency Identification (RFID) technology, Infrared Data Association (IrDA) technology, Ultra Wide Band (UWB) technology, Bluetooth (BT) technology and other technologies.

In an embodiment, the UE 4200 can be implemented by at least one application specific integrated circuit (ASIC), digital signal processor (DSP), digital signal processing device (DSPD), programmable logic device (PLD), field programmable gate array (FPGA), controller, microcontroller, microprocessor, or another electronic element, for executing the above methods.

Figure 43:
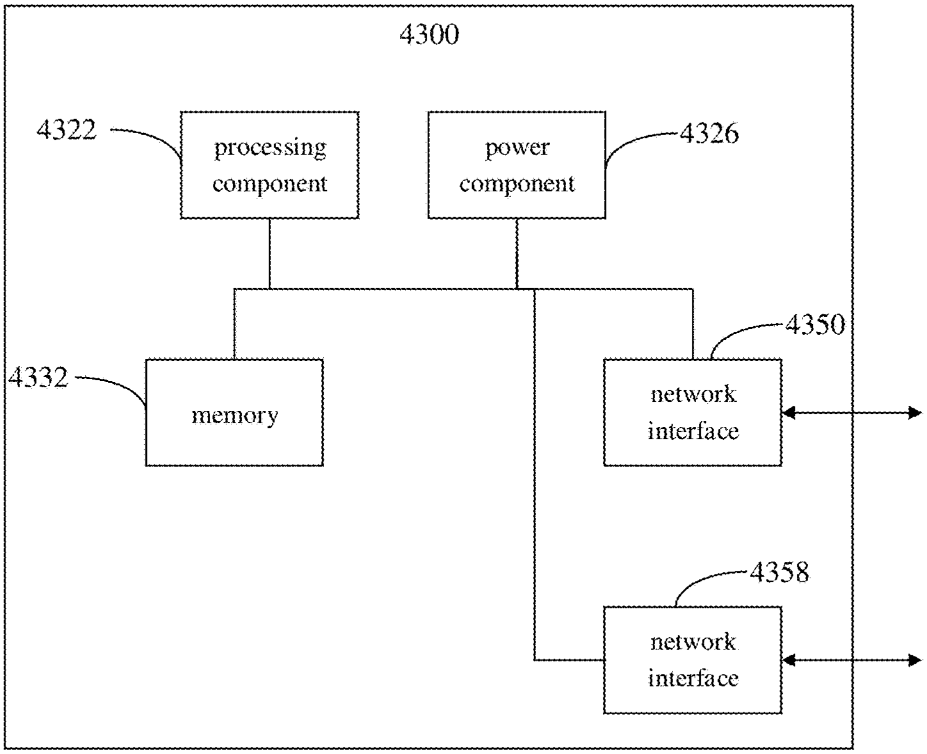
FIG. 43 is a block diagram of a base station provided in an embodiment of the present disclosure.

FIG. 43 is a block diagram of a base station 4300 provided in the present embodiment. For example, the base station 4300 can be provided as a base station. Referring to FIG. 43, the base station 4300 includes a processing component 4322, which further includes at least one processor and a memory resource represented by the memory 4332 for storing an instruction that can be executed by the processing component 4322, such as an application program. The application program stored in the memory 4332 may include one or more modules, and every one module is corresponded to a set of instructions. In addition, the processing component 4322 is configured to execute the instruction to execute any of the aforementioned methods applied to the base station, such as the method shown in FIG. 1.

The base station 4300 may also include a power component 4326 configured to execute power management of the base station 4300, a wired or wireless network interface 4350 configured to connect the base station 4300 to the network, and an input output (I/O) interface 4358. The base station 4300 can operate an operating system stored in the memory 4332, such as Windows Server™, Mac OS X™, Unix™, Linux™, Free BSD™, or similar.

In the above-described embodiments provided in the present disclosure, the methods provided in the embodiments of the present disclosure are described from the perspectives of the base station, the UE, and the RIS array, respectively. In order to realize each of the functions in the method provided by the above embodiments of the present disclosure, the base station and the UE may include a hardware structure, a software module, and realize each of the above functions in the form of the hardware structure, the software module, or the hardware structure plus the software module. A function of each of the above-described functions may be executed in the form of the hardware structure, the software module, or the hardware structure plus the software module.

In the above-described embodiments provided in the present disclosure, the methods provided in the embodiments of the present disclosure are described from the perspectives of the base station, the UE, and the RIS array, respectively. In order to realize each of the functions in the method provided by the above embodiments of the present disclosure, a network side equipment and the UE may include a hardware structure, a software module, and realize each of the above functions in the form of the hardware structure, the software module, or the hardware structure plus the software module. A function of each of the above-described functions may be executed in the form of the hardware structure, the software module, or the hardware structure plus the software module.

The embodiments of the present disclosure provide a communication device. The communication device may include a transceiver module and a processing module. The transceiver module may include a transmitting module and/or a receiving module, the transmitting module for realizing a transmitting function, and the receiving module for realizing a receiving function, and the transceiver module may realize the transmitting function and/or the receiving function.

The communication device may be the terminal equipment (such as the terminal equipment in the above method embodiment), a device in the terminal equipment, or a device capable of being matched for use with the terminal equipment. Alternatively, the communication device may be a network equipment, or a device in a network equipment, or a device capable of being matched for use with a network equipment.

Another communication device is provided by embodiments of the present disclosure. The communication device may be the network equipment, the terminal equipment (such as the terminal equipment in the above method embodiment), a chip, a chip system, or a processor, etc. that supports the network equipment to realize the above method, or a chip, a chip system, or a processor, etc. that supports the terminal equipment to realize the above method. The device may be used to realize the method described in the above-described method embodiments, as may be described in the above-described method embodiments.

The communication device may include one or more processors. The processor may be a general purpose processor or a specialized processor, etc. For example, it may be a baseband processor or a central processor. The baseband processor may be configured for processing the communication protocol as well as the communication data, and the central processor may be configured for controlling the communication device (e.g., a network-side equipment, a baseband chip, a terminal equipment, a terminal equipment chip, DU or CU, etc.), executing a computer program, and processing data of the computer program.

Optionally, the communication device may further include one or more memories on which a computer program may be stored, the processor executing the computer program to cause the communication device to execute the method described in the above method embodiment. Optionally, data may also be stored in the memory. The communication device and the memory may be provided separately or may be integrated together.

Optionally, the communication device may further include a transceiver, and an antenna. The transceiver may be referred to as a transceiver unit, a transceiver machine, or a transceiver circuit, etc., and is configured to realize a transceiver function. The transceiver may include a receiver and a transmitter, the receiver may be referred to as a receiving machine or a receiving circuit, etc., for realizing the receiving function, and the transmitter may be referred to as a transmitting machine or a transmitting circuit, etc., for realizing the transmitting function.

Optionally, the communication device may further include one or more interface circuits. The interface circuit is configured to receive a code instruction and transmit them to a processor. The processor runs the code instruction to cause the communication device to execute the method described in the above method embodiment.

The communication device is the MN base station (such as the MN base station in the method embodiment described above): the processor is configured to execute the method shown in any one of FIG. 1-FIG. 8*b*.

The communication device is the SN base station, the processor is configured to execute the method shown in any one of FIG. 9*a*-FIG. 15.

The communication device is the base station group, the processor is configured to execute the method shown in any of FIG. 16*a*-FIG. 30.

The communication device is the terminal equipment, the transceiver is configured to execute the method shown in any of FIG. 31*a*-FIG. 37.

In one implementation, the processor may include the transceiver for implementing a receiving and transmitting function. The transceiver may for example be a transceiver circuit, or an interface, or an interface circuit. The transceiver circuit, the interface, or the interface circuit for implementing the receiving and transmitting function may be separate or may be integrated together. The transceiver circuit, the interface, or the interface circuit described above may be configured for code/data reading and writing, or, the transceiver circuit, the interface, or the interface circuit described above may be used for signal transmission or delivery.

In one implementation, the processor may hold a computer program, and the computer program running on the processor may cause the communication device to perform the method described in the above method embodiments. The computer program may be solidified in the processor, in which case the processor may be implemented by a hardware.

In an implementation, the communication device may comprise a circuit, the circuit may realize the function of sending or receiving or communicating in the method embodiments described above. The processor and the transceiver described in the present disclosure may be implemented on an integrated circuit (IC), an analog IC, a radio frequency integrated circuits RFIC, a mixed signal IC, an application specific integrated circuit (ASIC), a printed circuit board (PCB), and an electronic equipment, etc. The processor and the transceiver can also be fabricated using various IC process technologies such as a complementary metal oxide semiconductor (CMOS), a nMetal-oxide-semiconductor (NMOS), a positive channel metal oxide semiconductor (PMOS), a bipolar junction transistor (BJT), a bipolar CMOS (BiCMOS), a silicon-germanium (SiGe), a gallium arsenide (Gas) and so on.

The communication device in the above description of embodiments may be the network equipment or the terminal equipment (such as the terminal equipment in the above method embodiments), but the scope of the communication device described in the present disclosure is not limited thereto, and the structure of the communication device may be unrestricted. The communication device may be a stand-alone device or may be part of a larger device. For example the described communication device may be:

(1) a stand-alone integrated circuit IC, or a chip, or, a chip system or subsystem;
(2) a collection of ICs having one or more ICs, optionally, the collection of ICs may also include a storage part for storing data, a computer program;
(3) an ASIC, such as a modem;
(4) modules that can be embedded within other equipment;
(5) a receiver, a terminal equipment, a smart terminal equipment, a cellular phone, a wireless equipment, a handheld, a mobile unit, an in-vehicle equipment, a network equipment, a cloud equipment, an artificial intelligence equipment, and the like;
(6) Others, etc.

For the case where the communication device may be the chip or the chip system, the chip includes a processor and an interface. The number of the processors may be one or more, and the number of the interfaces may be more than one.

Optionally, the chip further includes a memory, the memory is configured to store necessary computer programs and data.

Those skill in the art may also appreciate that various illustrative logical blocks and steps listed in the embodiments of the present disclosure may be implemented by an electronic hardware, a computer software, or a combination of both. Whether such function is implemented by the hardware or the software depends on a particular application and a design requirement of the overall system. Those skilled in the art may, for each particular application, may use a variety of methods to implement the described function, but such implementation should not be construed as being outside the scope protected by the embodiments of the present disclosure.

Embodiments of the present disclosure also provide a system, the system includes the communication device as the terminal equipment (e.g., the first terminal equipment in the above method embodiments) in the above embodiments and the communication device as the network equipment. Alternatively, the system includes the communication device as the terminal equipment (e.g., the first terminal equipment in the above method embodiments) in the above embodiments and the communication device as the network equipment.

The present disclosure also provides a readable storage medium having stored thereon an instruction which, when executed by a computer, realize the function of any of the above method embodiments.

The present disclosure also provides a computer program product that realizes the function of any of the above method embodiments when executed by a computer.

In the above embodiments, this may be implemented in whole or in part by software, hardware, firmware, or any combination thereof. When implemented using the software, it may be implemented, in whole or in part, in the form of the computer program product. The computer program product includes one or more computer programs. When loading and executing the computer program on the computer, all or part of the processes or functions described in the embodiments of the present disclosure are generated. The computer may be a general computer, a specialized computer, a computer network, or other programmable device. The computer program may be stored in s computer-readable storage medium or transmitted from one computer-readable storage medium to another computer-readable storage medium, e.g., the computer program may be transmitted from a web site, a computer, a server, or a data center to another website site, computer, server, or data center via a wired mean (e.g., a coaxial cable, a fiber optic, a digital subscriber line (DSL)) or a wireless mean (e.g., an infrared, a wireless, a microwave, etc.). The computer-readable storage medium may be any usable medium to which the computer has access or a data storage equipment such as a server, a data center, etc. containing one or more available medium integrated. The available medium may be a magnetic medium (e.g., a floppy disk, a hard disk, a tape), an optical medium (e.g., a high-density digital video disc (DVD)), or a semiconductor medium (e.g., a solid state disk (SSD)), and so on.

Those ordinary skilled in the art may understand that the various numerical numbers such as the first, second, etc. involved in the present disclosure are only for the purpose of distinguishing for descriptive convenience, and are not used to limit the scope of the embodiments of the present disclosure, and also denote the order of precedence.

The at least one in the present disclosure may also be described as one or more, and the plurality may be two, three, four, or more, without limitation of the present disclosure. In the embodiments of the present disclosure, for a technical feature, the technical features in the technical feature are distinguished by "first", "second", "third", "A", "B", "C", and "D", etc. there is no order of precedence or order of magnitude among the technical features described by "first", "second", "third", "A", "second", "third", "A", "B", A", "B", "B", "C", and "D".

Other implementations of the invention will readily come to mind to those skilled in the art upon consideration of the specification and practice of the invention disclosed herein. The present disclosure is intended to cover any variations, uses, or adaptations of the present invention that follow a general principle of the present invention and that include common knowledge or commonly used technical means in the technical field that are not disclosed in the present disclosure. The specification and the embodiments are to be regarded as exemplary only, and the true scope and spirit of the present disclosure is indicated by the following claims.

It should be understood that the present disclosure is not limited to the precise structure which has been described above and illustrated in the accompanying drawings, and that various modifications and alterations may be made without departing from its scope. The scope of the present disclosure is limited only by the attached claims.

What is claimed is:

1. A measurement relaxation method, performed by a master node (MN) base station, comprising:

configuring a measurement relaxation criterion to a user equipment (UE);

wherein the measurement relaxation criterion comprises at least one of a Radio Link Monitoring (RLM) measurement relaxation criterion configured for a master cell; or a Beam Failure Detection (BFD) measurement relaxation criterion configured for a master cell or a secondary cell;

wherein the measurement relaxation criterion is configured by the MN base station to the UE in a new radio evolved universal terrestrial radio access dual connectivity (NE-DC) scenario; the measurement relaxation criterion is configured by the MN base station and a secondary node (SN) base station to the UE in a new radio-dual connectivity (NR-DC) scenario; or the measurement relaxation criterion is configured by an SN base station to the UE in an evolved universal terrestrial radio access network new radio-dual connectivity (EN-DC) scenario;

wherein the measurement relaxation criterion is configured per cell group;

the method further comprising at least one of:

sending capability information to an SN base station to cause the SN base station to configure the measurement relaxation criterion to the UE based on the capability information, wherein the capability information comprises at least one of information on whether the UE supports an RLM measurement relaxation or information on whether the UE supports a BFD measurement relaxation; or sending a first instruction to the SN base station; wherein the first instruction is used for the SN base station to determine to configure the measurement relaxation criterion to the UE.

2. The method according to claim 1, wherein the measurement relaxation criterion further comprises:

a Radio Resource management (RRM) measurement relaxation criterion.

3. The method according to claim 1, further comprising:

sending a relaxation indication to the UE in response to the UE satisfying the measurement relaxation criterion, wherein the relaxation indication is configured to instruct the UE to execute a measurement relaxation.

4. The method according to claim 3, wherein sending the relaxation indication to the UE comprises:

obtaining relaxation result information sent by an SN base station, wherein the relaxation result information comprises: result information that the SN base station instructs the UE to execute the measurement relaxation, or, result information that the SN base station instructs the UE not to execute the measurement relaxation; and deciding whether to send the relaxation indication to the UE based on the relaxation result information.

5. The method according to claim 1, further comprising: sending a second instruction to an SN base station, wherein the second instruction is configured to instruct the SN base station to send a relaxation indication to the UE, or, instruct the SN base station not to send a relaxation indication to the UE.

6. A measurement relaxation method, performed by a secondary node (SN) base station, comprising:

configuring a measurement relaxation criterion to a user equipment (UE);

wherein the measurement relaxation criterion comprises at least one of a Radio Link Monitoring (RLM) measurement relaxation criterion configured for a master cell; or a Beam Failure Detection (BFD) measurement relaxation criterion configured for a master cell or a secondary cell;

wherein the measurement relaxation criterion is configured by an SN base station to the UE in an evolved universal terrestrial radio access network new radio-dual connectivity (EN-DC) scenario; the measurement relaxation criterion is configured by a master node (MN) base station to the UE in a new radio evolved universal terrestrial radio access dual connectivity (NE-DC) scenario; or the measurement relaxation criterion is configured by the MN base station and a secondary node (SN) base station to the UE in a new radio-dual connectivity (NR-DC) scenario;

wherein the measurement relaxation criterion is configured per cell group;

the method further comprising at least one of:

obtaining capability information sent by the MN base station, and configuring the measurement relaxation criterion to the UE based on the capability information, wherein the capability information comprises at least one of information on whether the UE supports an RLM measurement relaxation or information on whether the UE supports a BFD measurement relaxation; or obtaining a first instruction sent by an MN base station, wherein the first instruction is used for the SN base station to determine to configure the measurement relaxation criterion to the UE.

7. The method according to claim 6, wherein the measurement relaxation criterion further comprises:

a Radio Resource management (RRM) measurement relaxation criterion.

8. The method according to claim 6, further comprising: sending a relaxation indication to the UE in response to the UE satisfying the measurement relaxation criterion, wherein the relaxation indication is configured to instruct the UE to execute a measurement relaxation.

9. The method according to claim 8, wherein sending the relaxation indication to the UE comprises at least one of:

obtaining a second instruction sent by an MN base station, and sending the relaxation indication to the UE based on the second instruction, wherein the second instruction is configured to instruct the SN base station to send the relaxation indication to the UE, or, instruct the SN base station not to send the relaxation indication to the UE; or autonomously sending, by the SN base station, the relaxation indication to the UE.

10. The method according to claim 6, further comprising: sending relaxation result information to an MN base station, wherein the relaxation result information comprises: result information that the SN base station instructs the UE to execute a measurement relaxation, or, result information that the SN base station instructs the UE not to execute a measurement relaxation.

11. The method according to claim 1, wherein configuring the measurement relaxation criterion to the UE by the MN base station and the SN base station, respectively, comprises one of:

autonomously determining, by the MN base station, whether to configure the measurement relaxation criterion to the UE; and configuring, by the SN base station, the measurement relaxation criterion to the UE based on the first instruction of the MN base station, wherein the first instruction is configured to indicate whether the SN base station configures the measurement relaxation criterion to the UE;

autonomously determining, by the MN base station, whether to configure the measurement relaxation criterion to the UE; and configuring, by the SN base station, the measurement relaxation criterion to the UE based on the capability information sent by the MN base station, wherein the capability information comprises information on whether the UE supports an RLM measurement relaxation; or autonomously determining, by the MN base station, whether to configure the measurement relaxation criterion to the UE; and autonomously determining, by the SN base station, whether to configure the measurement relaxation criterion to the UE.

12. The method according to claim 1, wherein sending the first instruction to the SN base station comprises:

obtaining auxiliary information sent by the SN base station; and sending the first instruction to the SN base station based on the auxiliary information.

13. The method according to claim 6, wherein the measurement relaxation criterion is configured to the UE by the MN base station and the SN base station to the UE by performing one of:

autonomously determining, by the MN base station, whether to configure the measurement relaxation criterion to the UE; and configuring, by the SN base station, the measurement relaxation criterion to the UE based on the first instruction of the MN base station, wherein the first instruction is configured to indicate whether the SN base station configures the measurement relaxation criterion to the UE;

autonomously determining, by the MN base station, whether to configure the measurement relaxation criterion to the UE; and configuring, by the SN base station, the measurement relaxation criterion to the UE based on the capability information sent by the MN base station, wherein the capability information comprises information on whether the UE supports an RLM measurement relaxation; or autonomously determining, by the MN base station, whether to configure the measurement relaxation criterion to the UE; and autonomously determining, by the SN base station, whether to configure the measurement relaxation criterion to the UE.

14. The method according to claim 6, wherein obtaining the first instruction sent by the MN base station comprises:

sending auxiliary information to the MN base station; and obtaining the first instruction sent by the MN base station based on the auxiliary information.

15. A measurement relaxation method, performed by a user equipment (UE), comprising:

receiving a measurement relaxation criterion configured by a base station;

wherein the measurement relaxation criterion comprises at least one of a Radio Link Monitoring (RLM) measurement relaxation criterion configured for a master cell; or a Beam Failure Detection (BFD) measurement relaxation criterion configured for a master cell or a secondary cell;

wherein the measurement relaxation criterion is configured by a master node (MN) base station to the UE in a new radio evolved universal terrestrial radio access dual connectivity (NE-DC) scenario; the measurement relaxation criterion is configured by the MN base station and a secondary node (SN) base station to the UE in a new radio-dual connectivity (NR-DC) scenario;

or the measurement relaxation criterion is configured by an SN base station to the UE in an evolved universal terrestrial radio access network new radio-dual connectivity (EN-DC) scenario;

wherein the measurement relaxation criterion is configured per cell group;

wherein the base station comprises at least one of the MN base station or the SN base station; the MN base station sends at least one of capability information or a first instruction to the SN base station; wherein the capability information comprises at least one of information on whether the UE supports an RLM measurement relaxation or information on whether the UE supports a BFD measurement relaxation, and the SN base station configures the measurement relaxation criterion to the UE based on the capability information, the first instruction is used for the SN base station to determine to configure the measurement relaxation criterion to the UE.

16. The method according to claim 15, wherein the measurement relaxation criterion further comprises:

a Radio Resource management (RRM) measurement relaxation criterion.

17. The method according to claim 15, wherein receiving the measurement relaxation criterion configured by the base station comprises at least one of:

receiving the measurement relaxation criterion configured by the MN base station and the SN base station, respectively;

receiving only the measurement relaxation criterion configured by the MN base station; or receiving only the measurement relaxation criterion configured by the SN base station.

18. The method according to claim 15, further comprising:

receiving a relaxation indication sent by the base station in response to the UE satisfying the measurement relaxation criterion, and executing a measurement relaxation operation based on the relaxation indication.

19. The method according to claim 18, wherein receiving the relaxation indication sent by the base station comprises at least one of:

receiving the relaxation indication sent by an MN base station and an SN base station, respectively;

receiving only the relaxation indication sent by an MN base station; and receiving only the relaxation indication sent by an SN base station.

20. The method according to claim 15, wherein the measurement relaxation criterion is configured to the UE by the MN base station and the SN base station to the UE by performing one of:

autonomously determining, by the MN base station, whether to configure the measurement relaxation criterion to the UE; and configuring, by the SN base station, the measurement relaxation criterion to the UE based on the first instruction of the MN base station, wherein the first instruction is configured to indicate whether the SN base station configures the measurement relaxation criterion to the UE;

autonomously determining, by the MN base station, whether to configure the measurement relaxation criterion to the UE; and configuring, by the SN base station, the measurement relaxation criterion to the UE based on the capability information sent by the MN base station, wherein the capability information comprises information on whether the UE supports an RLM measurement relaxation; or autonomously determining, by the MN base station, whether to configure the measurement relaxation criterion to the UE; and autonomously determining, by the SN base station, whether to configure the measurement relaxation criterion to the UE.

* * * * *